US012079676B2

(12) United States Patent
Okabe

(10) Patent No.: US 12,079,676 B2
(45) Date of Patent: Sep. 3, 2024

(54) INFORMATION CODE AND INFORMATION CODE GENERATION METHOD

(71) Applicant: DENSO CORPORATION, Kariya (JP)

(72) Inventor: Tatsuya Okabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/062,362

(22) Filed: Dec. 6, 2022

(65) Prior Publication Data

US 2023/0094590 A1 Mar. 30, 2023

Related U.S. Application Data

(63) Continuation of application No. PCT/JP2021/021497, filed on Jun. 7, 2021.

(30) Foreign Application Priority Data

Jun. 11, 2020 (JP) ................................. 2020-101758

(51) Int. Cl.
*G06K 19/06* (2006.01)

(52) U.S. Cl.
CPC . *G06K 19/06028* (2013.01); *G06K 19/06037* (2013.01)

(58) Field of Classification Search
CPC .. G06K 19/06037; G06K 19/00; G06K 19/06; G06K 7/1417
USPC ............... 235/494, 487, 375, 462.01, 462.09
See application file for complete search history.

(56) References Cited

U.S. PATENT DOCUMENTS 5,331,137 A * 7/1994 Swartz ................... G09B 7/063 235/462.07
RE44,139 E 4/2013 Cheong et al.
RE44,982 E 7/2014 Cheong et al.
2005/0199721 A1 9/2005 Chang et al.
2006/0097062 A1 5/2006 Cheong et al.
2006/0098241 A1 5/2006 Cheong et al.
2007/0114285 A1 5/2007 Chang et al.
2008/0191023 A1 8/2008 Harris
2009/0103803 A1 4/2009 Kumar et al.
2009/0323959 A1 12/2009 Hara
2010/0243747 A1 * 9/2010 Saito ................ G06K 19/06028 235/494
2013/0048726 A1 * 2/2013 Cunningham, IV ......................... G06K 7/1465 235/440
2013/0136354 A1 5/2013 Cheong et al.

(Continued)

FOREIGN PATENT DOCUMENTS

JP 2004-355122 A 12/2004
JP 2006-178692 A 7/2006
WO WO-2019132047 A1 * 7/2019 ............... G06K 1/12

*Primary Examiner* — Edwyn Labaze
(74) *Attorney, Agent, or Firm* — MASCHOFF BRENNAN

(57) ABSTRACT

An information code that records information read by a first reader and a second reader, includes: a plurality of bar areas; and a plurality of space areas disposed between the plurality of bar areas. The plurality of the bar areas and the plurality of space areas provide a barcode for recording a first information recognized by the first reader. At least one of the plurality of bar areas and the plurality of space areas provide a second information recognized by the second reader in a format including a hash value with an arrangement of a plurality of colors defined so as not to change a discrimination between the bar areas and the space areas by the first reader.

11 Claims, 20 Drawing Sheets

(56) References Cited

U.S. PATENT DOCUMENTS

| | | | |
|---|---|---|---|
| 2013/0136361 | A1 | 5/2013 | Cheong et al. |
| 2013/0148888 | A1 | 6/2013 | Cheong et al. |
| 2013/0221105 | A1 | 8/2013 | Cheong et al. |
| 2013/0322631 | A1 | 12/2013 | Hara |
| 2014/0119647 | A1 | 5/2014 | Cheong et al. |
| 2014/0191027 | A1 | 7/2014 | Simske et al. |
| 2017/0091505 | A1 * | 3/2017 | Chamandy ....... G06K 19/06056 |
| 2017/0220916 | A1 | 8/2017 | Zhao et al. |

* cited by examiner

FIG. 7

| | FIRST STEP | SECOND STEP | THIRD STEP | FOURTH STEP |
|---|---|---|---|---|
| LEFT BLACK 1 | B+B →NORMAL BARCODE<br>B+75% →COLOR BARCODE<br>75%+B →BLACK-AND-WHITE BARCODE<br>75%+75% →COMBINATION BARCODE | | B<br>BLACK →USE<br>75%<br>BLACK →NOT USE | B<br>WHITE →USE<br>75%<br>WHITE →NOT USE |
| LEFT WHITE 2 | W<br>THREE COLORS →NOT USE<br>25%<br>THREE COLORS →USE | W<br>FOUR COLORS →NOT USE<br>25%<br>FOUR COLORS →USE | W<br>FIVE COLORS →NOT USE<br>25%<br>FIVE COLORS →USE | W<br>SIX COLORS →NOT USE<br>25%<br>SIX COLORS →USE |
| LEFT BLACK 2 | B<br>SEVEN COLORS →NOT USE<br>75%<br>SEVEN COLORS →USE | B<br>EIGHT COLORS →NOT USE<br>75%<br>EIGHT COLORS →USE | MASK PATTERN (TWO BITS) | |
| RIGHT BLACK 2 | MASK PATTERN (TWO BITS) | | NUMBER OF LINES (TWO BITS) | |
| RIGHT WHITE 2 | OTHERS (FOUR BITS) | | | |
| RIGHT BLACK 1 | NUMBER OF LINES (TWO BITS) | | B+B →NORMAL BARCODE<br>B+75% →COLOR BARCODE<br>75%+B →BLACK-AND-WHITE BARCODE<br>75%+75% →COMBINATION BARCODE | |

B : BLACK
75% : DARK GRAY
25% : LIGHT GRAY
W : WHITE

■ ···CLbr : BLACK
▩ ···CLbn : DARK GRAY
□ ···CLwr : WHITE
⬚ ···CLwn : LIGHT GRAY

INFORMATION CODE AND INFORMATION CODE GENERATION METHOD

CROSS REFERENCE TO RELATED APPLICATIONS

The present application is a continuation application of International Patent Application No. PCT/JP2021-021497 filed on Jun. 7, 2021, which designated the U.S. and claims the benefit of priority from Japanese Patent Application No. 2020-101758 filed on Jun. 11, 2020. The entire disclosures of all of the above applications are incorporated herein by reference.

TECHNICAL FIELD

The disclosure by this specification relates to a technique of information code that records information.

BACKGROUND

In the barcode according to a conceivable technique, a part of the bar, which is mainly black, is colored blue or the like. Similarly, a part of the space between the bars, which is mainly white, is colored red or the like. When these barcodes are read by a normal barcode reader, the colored bars and spaces are recognized in the same way as normal bars and spaces. On the other hand, when the above barcode is read by a camera device, the colored bars and spaces are distinguished from the usual black bars and white spaces. Therefore, the camera device can read information that cannot be read by the barcode reader.

SUMMARY

According to an example, an information code that records information read by a first reader and a second reader, includes: a plurality of bar areas; and a plurality of space areas disposed between the plurality of bar areas. The plurality of the bar areas and the plurality of space areas provide a barcode for recording a first information recognized by the first reader. At least one of the plurality of bar areas and the plurality of space areas provide a second information recognized by the second reader in a format including a hash value with an arrangement of a plurality of colors defined so as not to change a discrimination between the bar areas and the space areas by the first reader.

BRIEF DESCRIPTION OF THE DRAWINGS

The above and other objects, features and advantages of the present disclosure will become more apparent from the following detailed description made with reference to the accompanying drawings. In the drawings:

FIG. 7 is a diagram showing a table indicating details of format information in a list;

DETAILED DESCRIPTION

Figure 1:
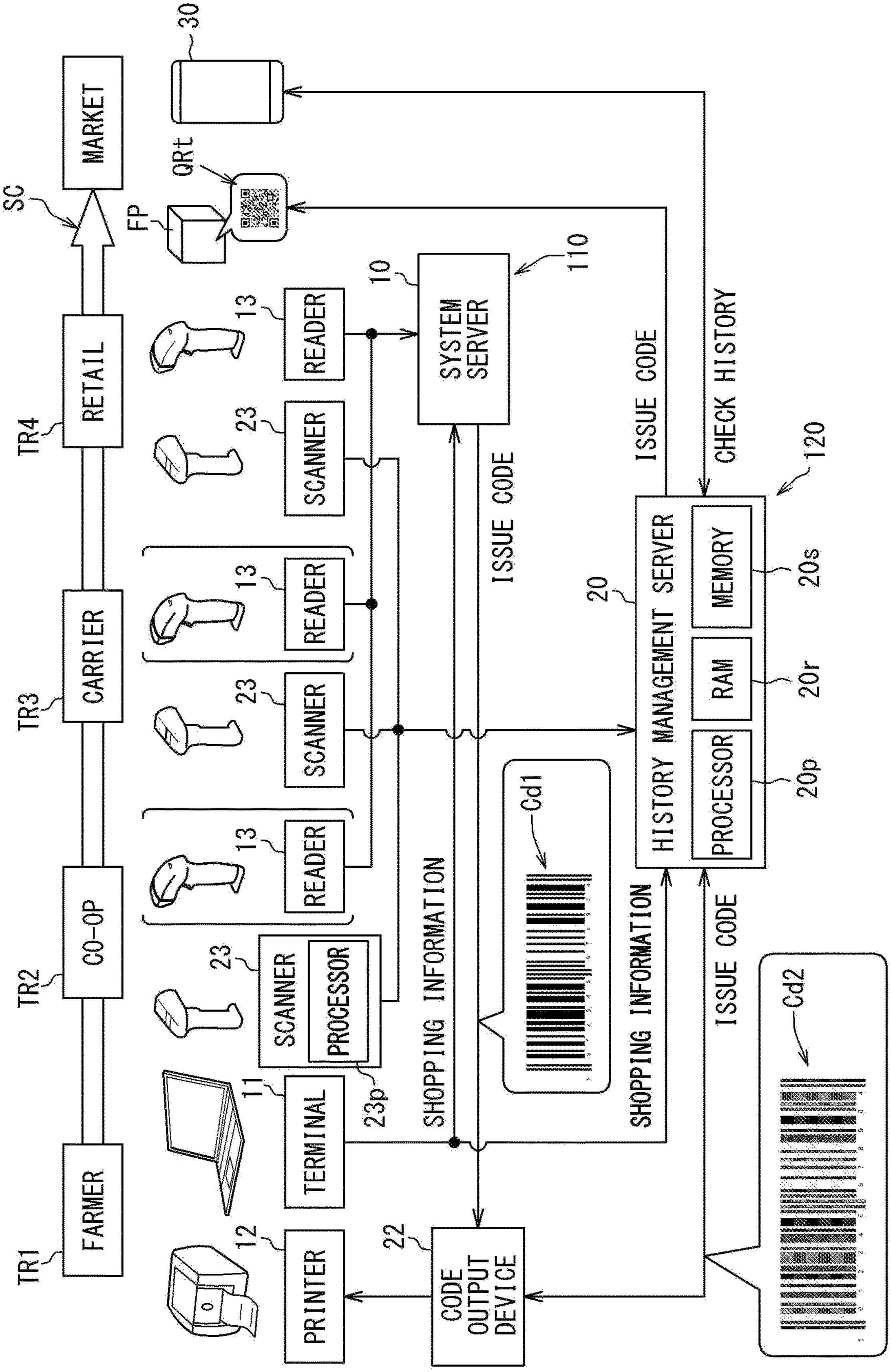
FIG. 1 is a diagram showing an overall view when the traceability system according to the first embodiment of the present disclosure is operated together with an existing distribution management system.

The barcode of the conceivable technique has a difficulty that it is not sufficiently convenient. The object of this disclosure is to provide an information code or the like that can ensure convenience while recording a plurality of types of information.

In order to achieve the above object, according to one aspect of the present embodiments, an information code for recording information read by a first reader and a second reader, includes: a plurality of bar areas and a plurality of space areas disposed between the plurality of bar areas. The plurality of bar areas and the plurality of space areas provide a bar code for recording a first information recognized by the first reader. At least one of the plurality of bar areas and the plurality of space areas provide an information code for recording a second information in a format including a hash value according to an arrangement of a plurality of colors defined so as not to change a determination of the bar areas and the space areas by the first reader. The second information is recognized by the second reader.

In this aspect, the second information recognized by the second reader is recorded in a format including a hash value. Since the length of such a hash value is predetermined, the information code can appropriately record the second information even if the content of the second information changes. According to the above, it is possible to ensure the convenience of the information code even if the amount of information that can be recorded as the second information is limited.

According to one aspect of the present embodiments, an information code for recording information read by a first reader and a second reader, includes: a plurality of bar areas and a plurality of space areas disposed between the plurality of bar areas. The plurality of bar areas and the plurality of space areas provide a bar code for recording a first information recognized by the first reader. At least one of the plurality of bar areas and the plurality of space areas provide an information code for recording a second information according to an arrangement of a plurality of colors having different brightness within a range not to change a determination of the bar areas and the space areas by the first reader. The second information is recognized by the second reader.

In this aspect, the second information recognized by the second reader is recorded by an arrangement of a plurality of colors having different brightness within a range that does not change the determination of the first reader. Therefore, even if the information code output means does not support color, the information code for recording the second information can be used. Therefore, the convenience of the information code can be ensured.

Further, one aspect of the present embodiments provides an information code for recording information read by a first reader and a second reader, and the information code includes a plurality of bar areas and a plurality of space areas disposed between the plurality of bar areas. The plurality of bar areas and the plurality of space areas provide a barcode for recording the first information recognized by the first reader. At least one of the plurality of bar areas and the plurality of space areas include a predetermined pattern. A second information recognized by the second reader is recorded using an arrangement of each area in which the predetermined pattern is disposed.

In this aspect, the second information recognized by the second reader is recorded by an arrangement of each area providing the predetermined pattern. Therefore, even if the information code output means does not support color output and intermediate color output, the information code recording the second information can be used. Therefore, the convenience of the information code can be ensured.

Further, one aspect of the present embodiments provides an information code in which both a first information read by a first reader and a second information read by a second reader are recorded in a plurality of cells arranged in two dimensions. The plurality of cells include a light color cell, a dark color cell, a first intermediate color cell having a first intermediate color that is closer to the light color cell than the dark color cell, and a second intermediate color cell having a second intermediate color that is closer to the dark color cell than the light color cell. The first reader recognizes the first intermediate color cell to be equal to the light color cell. The second reader recognizes the first intermediate color cell to be different from the light color cell. The first reader recognizes the second intermediate color cell to be equal to the dark color cell. The second reader recognizes the second intermediate color cell to be different from the dark color cell.

In this aspect, since the information code includes the first intermediate color cell and the second intermediate color cell, it is possible to record the first information recognized by the first reader and the second information recognized by the second reader into one information code. Then, it becomes easy to secure the amount of information for recording the second information, which can be recorded by the plurality of cells arranged two-dimensionally. As a result, the convenience of the information code can be ensured.

Further, one aspect of the present embodiments provides an information code generation method for generating an information code in which information read by a first reader and a second reader is recorded. The information code generation method includes a process executed by at least one processor. The process includes:

acquiring a barcode which has a plurality of bar areas and a plurality of space areas and records a first information recognized by the first reader;

determining a color arrangement pattern based on the second information recognized by the second reader. The color arrangement pattern is applied to at least one of the plurality of bar areas and the plurality of space areas, and has a plurality of colors defined so as not to change a recognition of the bar areas and the space areas by the first reader;

generating a plurality of candidates that have different arrangements of the plurality of colors from each other, by applying a mask having a plurality of patterns to the color arrangement pattern; and selecting one adoption pattern from the plurality of candidates.

In this aspect, the area ratio of each color used for recording the second information can be adjusted by the process of applying the mask having the plurality of patterns. According to the above, the information code of the color arrangement pattern suitable for the attached item or the like can be used. Therefore, the convenience of the information code can be ensured.

Hereinafter, multiple embodiments of the present disclosure will be described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. It should be understood that such unspecified combinations of configurations described in various embodiments and variation examples are also disclosed by the following description.

First Embodiment

The traceability system 120 according to the first embodiment of the present disclosure shown in FIG. 1 is a management system that manages transaction records of items traded between each trader in a supply chain SC constructed by including a plurality of traders. The supply chain SC is a connection between the traders for delivering, for example, industrial products, agricultural products, and marine products to consumers. As an example, in the supply chain SC for delivering agricultural products to consumers, traders include a farmer TR1, an agricultural cooperative TR2 which is a collection facility, a carrier TR3, a retailer TR4 and the like.

The existing distribution management system 110 is used for the management of the above supply chain SC. The distribution management system 110 corresponds to a conventional management system, and the traceability system 120 corresponds to a new management system. The traceability system 120 is operated together with the distribution management system 110 without changing the existing distribution management system 110. Hereinafter, the details of the distribution management system 110 and the traceability system 120 will be described in order.

<Distribution Management System 110>

Figure 2:
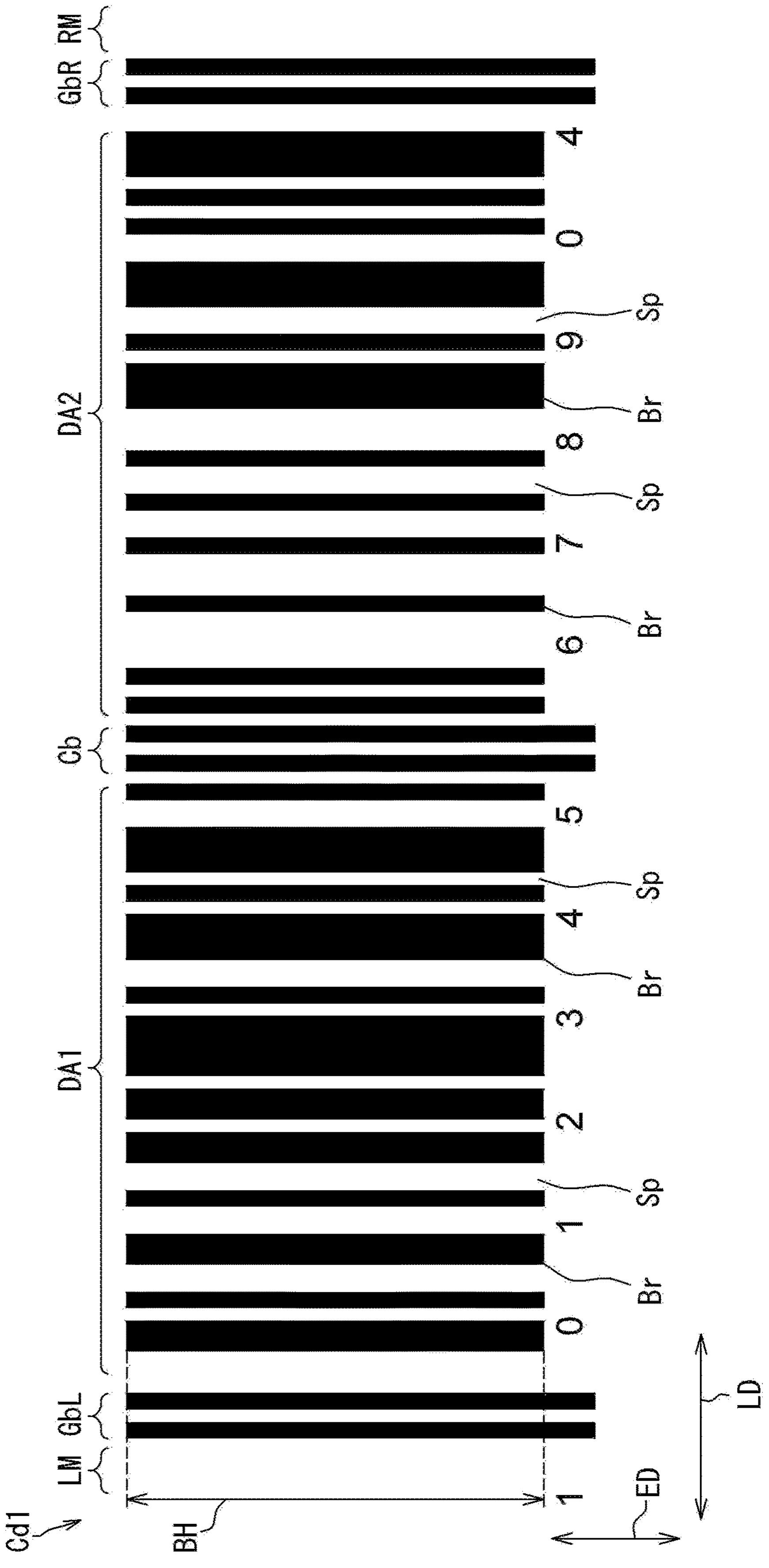
FIG. 2 is a diagram showing details of a barcode used in a distribution management system.

The distribution management system 110 collects transaction records of transaction items between traders using a barcode Cd1 (see FIG. 2). The distribution management system 110 includes an input terminal 11, a label printer 12, a barcode reader 13, a system server 10, and the like. The input terminal 11, the label printer 12, and the bar code reader 13 are appropriately installed in the facilities of individual traders. The input terminal 11, the label printer 12, and the bar code reader 13 are connected to the system server 10 installed in a data center or the like through a network.

The input terminal 11 is, for example, a personal computer, a tablet terminal, or the like. Basic information of transaction items (for example, vegetables and fruits) supplied to the supply chain SC is input to the input terminal 11 according to a predetermined format. As an example, information such as the product name, production area, production equipment, and producer of the transaction item is input as basic information. The input terminal 11 transmits the input basic information to the system server 10 as shipping information of the transaction item to be shipped.

The label printer 12 is an output device that prints a barcode Cd1 on a paper medium (a label or the like). The paper medium on which the barcode Cd1 is printed is attached as a label to the package or the outer box of the transaction item to be shipped, and is distributed in a state of being attached to the transaction item. The label printer 12 acquires the data of the barcode Cd1 generated by the system server 10 through the network. The barcode Cd1 is notified to the label printer 12 in the form of image data, text data, or the like. The label printer 12 may be a monochrome printer capable of performing only monochrome printing, or may be a color printer capable of performing color printing.

The barcode reader 13 is a reading device that reads the information recorded in the barcode Cd1 (hereinafter referred to as item information). The barcode reader 13 includes a light emitting unit, a light receiving unit, a signal processing unit, and the like. The light emitting unit has a light source such as a red LED (Light Emitting Diode) or a semiconductor laser. The light emitting unit irradiates a source light such as red light or laser light toward the barcode Cd1.

The light receiving unit mainly includes an image sensor in which CCD (Charge Coupled Device) elements are arranged one-dimensionally. The light receiving unit receives the reflected light reflected by the barcode Cd1. The reflectance of the source light on the barcode Cd1 is remarkably low in the bar Br (see FIG. 2), while it is relatively high in the space Sp (see FIG. 2). The light receiving unit outputs an analog waveform signal corresponding to the brightness and darkness of the reflected light due to the arrangement of the bar Br and the space Sp to the signal processing unit.

The signal processing unit AD-converts the analog waveform signal input from the light receiving unit into a digital waveform signal. In the digital waveform signal, the bar Br and the space Sp can be clearly discriminated as compared with the analog waveform signal. The signal processing unit decodes the digital waveform signal according to a predetermined rule and acquires the item information recorded in the barcode Cd1. The signal processing unit transmits the acquired item information to the system server 10.

The system server 10 is a host node capable of communicating with the input terminal 11, the label printer 12, and the barcode reader 13. The system server 10 registers the basic information acquired from the input terminal 11. The system server 10 prepares the item information associated with the basic information and generates the barcode Cd1 in which the item information is recorded. The system server 10 transmits the generated image data of the barcode Cd1 and the like to the label printer 12 at the transmission source of the basic information.

Further, when the system server 10 acquires the item information transmitted from the barcode reader 13, the system server 10 registers the transaction record of the trader who is the transmission source of the item information. Specifically, the system server 10 stores the trader name, transaction place, transaction time, transaction environment (for example, facility temperature), and the like of the item as a transaction record.

In the distribution management system 110, the barcode reader 13 may not have to be installed in the facilities of all traders. As an example, the bar code reader 13 may not have to be installed in the facilities of the agricultural cooperative TR2 and the carrier TR3, which are intermediate traders. In addition, the label printer 12 may be installed in a facility other than the farmer TR1. For example, when a received transaction item is distributed to a plurality of retail stores, a label printer 12 for printing a label attached to each transaction item may be installed in each trader's facility.

<Traceability System 120>

The traceability system 120 is used in combination with the distribution management system 110, and accumulates transaction records in the same manner as the distribution management system 110. The traceability system 120 has a record reference function that provides a transaction record so that the transaction record can be referred to, in addition to a record generation function that accumulates transaction records. In the traceability system 120, block chain technology is used for managing transaction records for the purpose of preventing falsification of transaction records.

The traceability system 120 collects transaction records by using the information code Cd2 (see FIGS. 3 to 5) generated based on the barcode Cd1 issued by the system server 10. In the traceability system 120, a plurality of types (i.e., patterns 1 to 3) of information codes Cd2, which will be described later, can be used. In each information code Cd2, as will be described later, the recording methods of information to be added for ensuring traceability are different from each other.

The traceability system 120 includes a code output device 22, a plurality of (i.e., many) code scanners 23, a history management server 20, and the like. In the traceability system 120, the input terminal 11 and the label printer 12 of the distribution management system 110 are used. The code output device 22, the code scanner 23, and the input terminal 11 are connected to a history management server 20 installed in a data center or the like through a network.

The code output device 22 is installed in the facility of the trader (for example, the farmer TR1) in which the label printer 12 is installed. The code output device 22 is installed so as to interrupt the communication line between the system server 10 and the label printer 12. The code output device 22 acquires the data of the barcode Cd1 transmitted from the system server 10 to the label printer 12. The code output device 22 transmits the acquired barcode Cd1 data to the history management server 20.

The code output device 22 receives the image data or text data of the information code Cd2 from the history management server 20. The information code Cd2 is generated based on the transmitted barcode Cd1, and further records information for the traceability system 120 (hereinafter, tracking information). The code output device 22 transmits the data of the information code Cd2 to the label printer 12 in place of the data of the barcode Cd1.

With the intervention of the code output device 22 as described above, the label printer 12 prints the information code Cd2 on a paper medium without recognizing the modification of the code data to be acquired. As a result, instead of the barcode Cd1, a paper medium (i.e., the label) on which the information code Cd2 is printed is attached to the transaction item. As described above, the information code Cd2 is distributed in a state of being attached to the transaction item.

The code output device 22 may also be installed in a facility of a trader other than the farmer TR1 in the same manner as the label printer 12. Further, the label printer for the traceability system 120 may be installed in the facility of the trader other than the farmer TR1. Such a label printer prints a new information code Cd2 issued for each transaction of an item on a paper medium. In such a form, as the transaction of the item progresses, the content of the information code Cd2 is updated to the content reflecting the transaction record up to that point.

The code scanner 23 is a reading device that reads the information as the tracking information recorded in the information code Cd2 and added to the barcode Cd1 separately from the item information. Since the code scanner 23 is configured to scan the same object as the barcode reader 13, it may be physically integrated with the barcode reader 13. In the traceability system 120, a code scanner 23 is installed in the facilities of all traders in general. As a result, the traceability system 120 accumulates more transaction records than the distribution management system 110.

The code scanner 23 includes an area sensor in which CCD elements are two-dimensionally arranged, a signal processing unit 23*p*, and the like. The area sensor can read the information recorded in a plane with a higher resolution than that of the barcode reader 13. In addition, the area sensor can detect not only the difference in color shade (difference in brightness) of the bar Br and space Sp (see FIG. 3 and the like) but also the difference in hue and saturation.

The signal processing unit 23*p* has a storage unit that stores an information code reading program and the like, a processing unit that executes a code reading process (see FIG. 10) described later based on the information code reading program, and a RAM. The signal processing unit 23*p* decodes the read signal of the area sensor according to a predetermined rule by the code reading process, and acquires the tracking information recorded in the information code Cd2 separately from the item information. The signal processing unit 23*p* communicates with the history management server 20 for keeping a transaction record based on the acquired tracking information.

The history management server 20 is a host node capable of communicating with the input terminal 11 in addition to the code output device 22 and the code scanner 23. The history management server 20 mainly includes a computer including a processing unit 20*p*, a RAM 20*r*, a storage unit 20*s*, an input/output interface, and a bus connecting them. The processing unit 20*p* is combined with the RAM 20*r*, and is provided by a hardware for executing an arithmetic processing. The processing unit 20*p* is configured to access the RAM 20*r* to perform processes related to data management. The storage unit 20*s* stores an information code generation program for causing the processing unit 20*p* to execute a code generation process (see FIG. 8) described later as one of the supply chain management programs related to data management.

The history management server 20 can acquire basic information to be transmitted from the input terminal 11 to the system server 10. In addition, the history management server 20 can obtain a notification from the code scanner 23 of each trader that the information code Cd2 has been read. Based on the information acquisition from the input terminal 11 and the code scanner 23, the history management server 20 generates a block chain for each transaction item, which is obtained by linking transaction records of individual traders as one block.

More specifically, when the history management server 20 acquires the basic information from the input terminal 11, the history management server 20 generates the first block in which the basic information is stored. Further, the history management server 20 calculates a hash value having a predetermined number of bits (for example, 256 bits) by inputting data of the first block including basic information into a hash function such as SHA-256.

When the history management server 20 acquires the data of the barcode Cd1 from the code output machine 22, the history management server 20 generates the information code Cd2 in which the above-mentioned hash value is recorded by the code generation process (see FIG. 8) described later, and transmits the information code Cd2 to the code output device 22. As a result, the hash value based on the basic information is recorded in the information code Cd2 and distributed together with the transaction item.

When the history management server 20 acquires the notification from the code scanner 23, the history management server 20 generates a new block for storing the transaction record of the notification source of the trader. In addition to this transaction record, the new block includes the hash value calculated from the previous block. The history management server 20 repeats the calculation of the hash value reflecting the distribution process up to that point as the transaction of the item between the traders progresses.

When the trader needs a new information code Cd2, the history management server 20 calculates a hash value of a new block. Then, the system server 10 regenerates the information code Cd2 that records the calculated hash value, and transmits the data of the regenerated information code Cd2 to the code output device 22 or the label printer at the request source.

The hash function used in the history management server 20 is a cryptographic hash function and has characteristics as follows: the cryptographic hash function does not output the same hash value in response to different inputs thereto; and the input cannot substantially be estimated from the output hash value. For example, instead of the SHA-256, another encryption algorithms such as SHA-1, SHA-2, and SHA-3 may be appropriately used according to the required output length (i.e., the numerical number of bits).

The history management server 20 issues a trace code QRt to be attached to the final product FP of the supply chain SC. The trace code QRt is a two-dimensional code such as a QR code (registered trademark). The trace code QRt is printed on the package of the final product FP or affixed to the final product FP in the form of a label or the like. The trace code QRt enables the consumer who obtained the final product FP to check the transaction record. In the trace code QRt, as an example, a hash value calculated from the last block of the block chain and an IP address or URL indicating a contact point for transaction records are recorded.

Consumers of the final product FP can view the transaction record of the final product FP by using the traceability confirmation application, for example, by using the user terminal 30 such as a smartphone or a tablet terminal.

Specifically, when the user terminal 30 reads the trace code QRt attached to the final product FP, it transmits a reference request of the transaction record together with a hash value to the history management server 20 as an inquiry destination. Upon receiving the reference request, the history management server 20 extracts the transaction record associated with the hash value and generates the data for provision. The history management server 20 transmits the generated provision data to the user terminal 30 that is the request source of the reference request. Consumers of the final product FP can check the history of transaction records by using the traceability confirmation application and expanding the provision data received from the history management server 20.

Next, the details of the barcode Cd1 and the information code Cd2 issued by the distribution management system 110 and the traceability system 120 described so far will be described below with reference to FIG. 1 based on FIGS. 2 to 7.

<Barcode Cd1>

The barcode Cd1 shown in FIG. 2 includes a plurality of bars Br and a plurality of spaces Sp. The color of the area of each bar Br is darker and deeper than the area of space Sp. Generally, the color of the area of the bar Br is black. On the other hand, the color of the area of each space Sp (i.e., background color) is lighter and brighter than the bar Br. Generally, the color of the space Sp region is white.

The barcode Cd1 records the item information recognized by the barcode reader 13 according to the arrangement of the plurality of bars Br and the plurality of spaces Sp. In the following description, the direction in which each bar Br is extended is defined as the extension direction ED, and the direction orthogonal to the extension direction ED, in which the bars Br are aligned, is defined as the longitudinal direction LD of the barcode Cd1.

As an example, a JAN (Japanese Article Number) code is used for the barcode Cd1. For the barcode Cd1, a standard different from the JAN code such as CODE39, CODE128, NW-7, and ITF may be adopted. The barcode Cd1 based on the JAN code defines a margin area LM, RM, a guard bar GbL, GbR, a center bar CB, a first data area DA1 and a second data area DA2.

The margin areas LM and RM are blank areas defined at both ends of the longitudinal LD of the barcode Cd1. The guard bars GbL and GbR are defined inside the left and right margin areas LM and RM, respectively, and include two bars Br. The center bar CB is defined in the center of the longitudinal LD of the barcode Cd1 and includes two bars Br. As an example, each bar Br arranged in the guard bars GbL, GbR and the center bar CB is slightly longer than each bar Br arranged in the first data area DA1 and the second data area DA2. The lengths of these bars Br may all be the same.

The first data area DA1 is an area defined between the left guard bar GbL and the center bar CB. The second data area DA2 is an area defined between the center bar CB and the right guard bar GbR. A six-digit numerical value is recorded in each of the data areas DA1 and DA2. In each data area DA1 and DA2, two bars Br and two spaces Sp are regarded as one unit for recording one numerical value. Specifically, any one of 0 to 9 is represented by the arrangement of the narrow bar, the wide bar, the narrow space, and the wide space. More specifically, the data from 0 to 9 is represented by a single character having seven columns. Two black lines and two white lines are provided for one character. The data from 0 to 9 is defined by a combination of 1 column black, 2 columns black, 3 columns black, 4 columns black, 1 column white, 2 columns white, 3 columns white, and 4 columns white. The reason why there is no black or white in 5 or more columns is that if 5 or more columns are used, other black or white columns cannot be represented within the 7 columns. Further, depending on the recording mode of each numerical value in the first data area DA1, the numerical value of the first digit of the barcode Cd1, that is, the numerical value written on the left side of the left guard bar GbL is recorded.

In the above barcode Cd1, the seven-digit or nine-digit numerical value on the left side indicates the company code including the country code. Furthermore, the five-digit or three-digit numerical value following the company code is used as the item code for identifying the product. The last (rightmost) digit is the parity bit for detecting a read error. In the barcode reader 13, the company code and the item code as the item information are recognized.

<Information Code Cd2>

Figure 3:
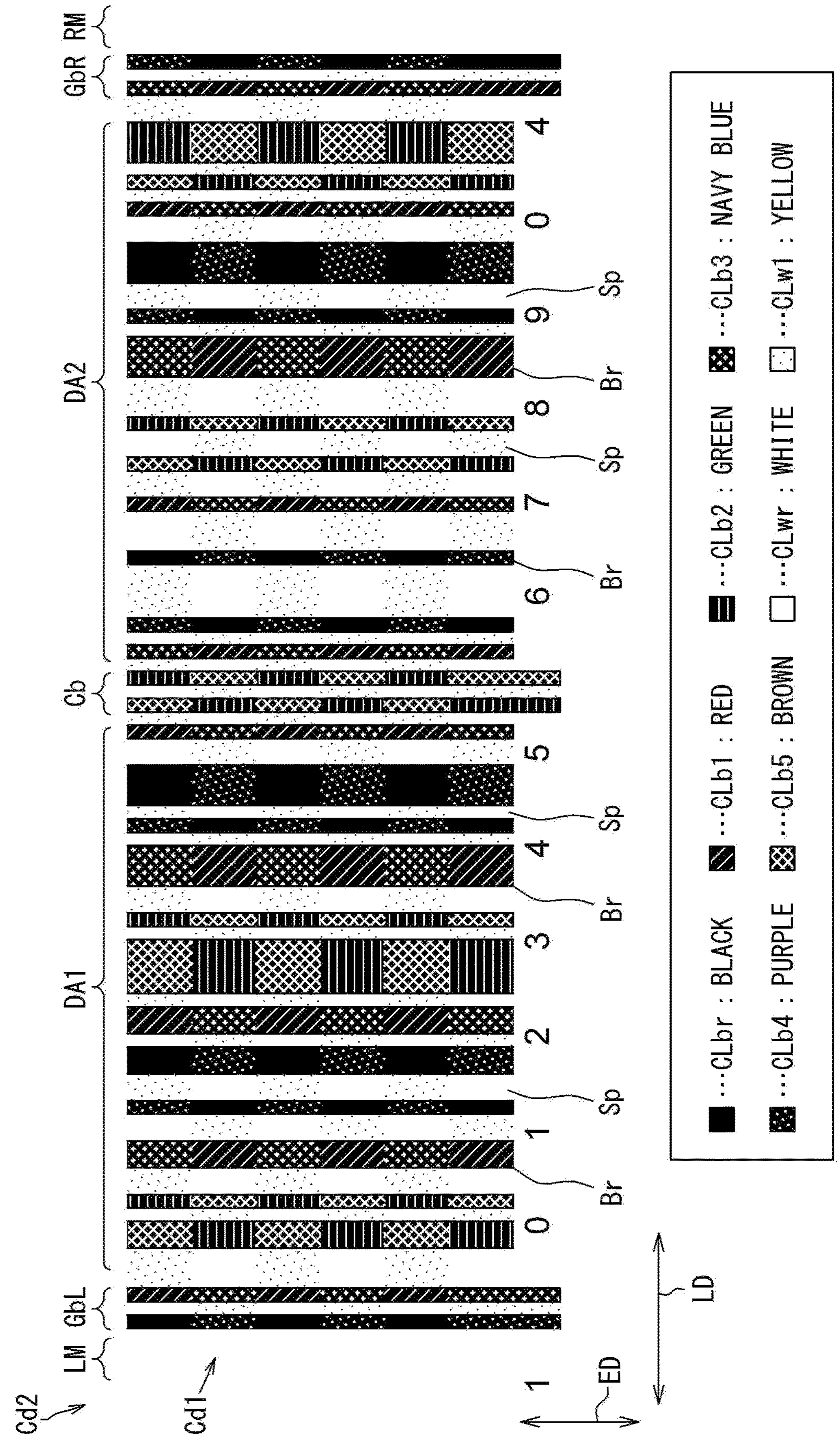
FIG. 3 is a diagram showing details of an information code of pattern 1 that can be used in a traceability system.
Figure 4:
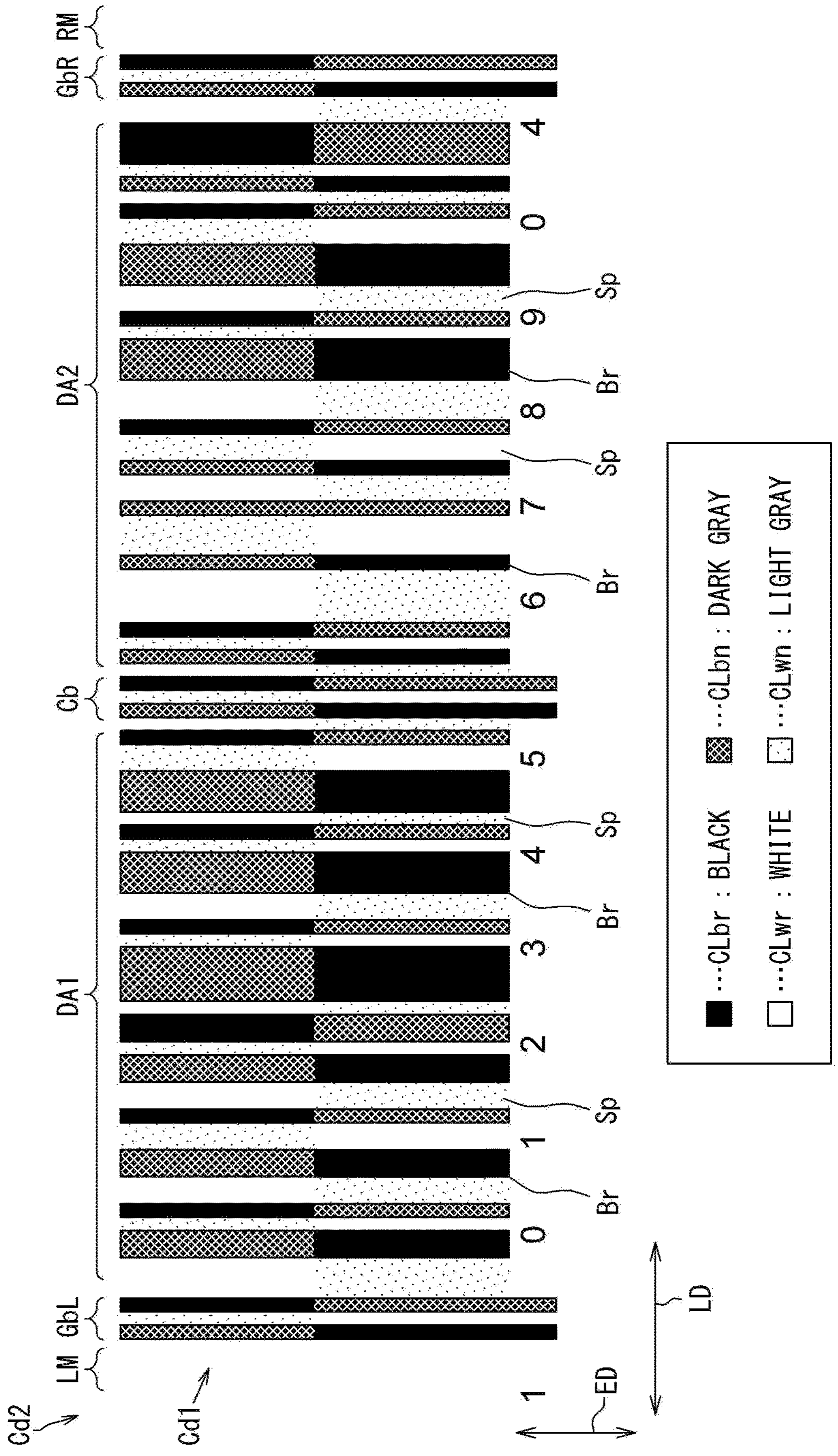
FIG. 4 is a diagram showing details of an information code of pattern 2.
Figure 5:
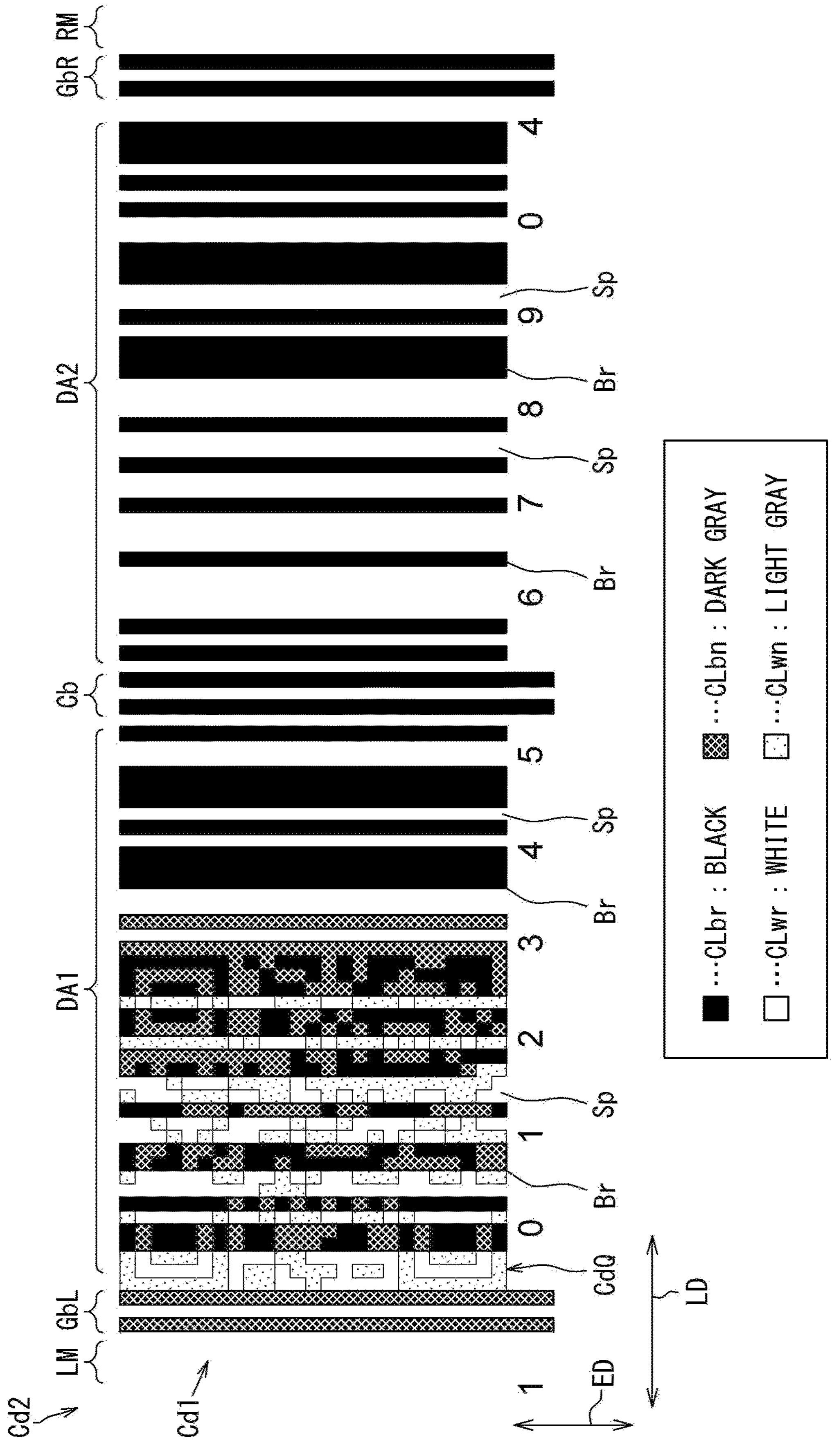
FIG. 5 is a diagram showing details of an information code of pattern 3.

The information codes Cd2 of the patterns 1 to 3 shown in FIGS. 3 to 5 are generated with reference to the barcode Cd1. The regional shapes of the bar Br and the space Sp in the barcode Cd1 are not changed and follow the information code Cd2. Tracking information recognized by the code scanner 23 is added to the information code Cd2. In the information code Cd2, at least a plurality of types (e.g., two types) of information such as item information and tracking information are recorded.

The tracking information is recorded in a format that includes at least a hash value and an IP address. As described above, the hash value is a value obtained by hashing the latest block of the block chain using a hash function. The IP address is a global IP address assigned to the history management server 20. The IP address indicates a hash value and a storage destination of data, that is, a data transmission destination when a transaction is performed, or a data reception source for acquiring transaction data.

The information code Cd2 of the pattern 1 shown in FIG. 3 is a color bar code. In the information code Cd2 of the pattern 1, both the regions of the plurality of bars Br and the plurality of spaces Sp record the tracking information by an arrangement of a plurality of colors having different hues from each other. The plurality of colors set for the bar Br and the space Sp, respectively, are defined so as not to change the discrimination between the bar Br and the space Sp by the bar code reader 13. Therefore, the barcode reader 13 can read the item information from the information code Cd2 in the same manner as the normal barcode Cd1, even if it is visually recognized by a human being that the barcodes are painted in a plurality of colors.

In the information code Cd2 of the pattern 1, in addition to the black CLbr as the reference color, a plurality of colors such as red CLb1, green CLb2, navy blue CLb3, purple CLb4, and brown CLb5 are assigned in advance as the color of the bar Br region. Further, as the color of the space Sp region, yellow CLw1 or the like is assigned in advance in addition to the white CLwr as the reference color.

Further, in the information code Cd2 of the pattern 1, each region of the plurality of bars Br and the plurality of spaces Sp is divided into a plurality of stages (e.g., six stages) in the extension direction ED. The divided portions of the regions adjacent to each other in the extension direction ED may be adjusted so as to have different color schemes from each other by, for example, a mask process described later. By adjusting the color scheme in this way, the boundaries of each divided stage become clear.

The information code Cd2 of the pattern 2 shown in FIG. 4 is a monochrome barcode. Even in the information code Cd2 of the pattern 2, tracking information is recorded in both the regions of the plurality of bars Br and the plurality of spaces Sp. The regions of the upper and lower stages of the bar Br and the space Sp are divided into upper and lower portions so that the lengths in the extension direction ED are substantially equal to each other. Each region of the bar Br and the space Sp records tracking information including at least a hash value and an IP address by an arrangement of a plurality of colors having different brightness from each other.

In the information code Cd2 of the pattern 2, in addition to the black CLbr as the reference color, a dark gray (for example, 75% gray) CLbn having a slightly higher brightness than the black CLbr is preliminarily assigned as the color of the bar Br region. Further, as the color of the space Sp region, in addition to the white CLwr as the reference color, a light gray (for example, 25% gray) CLwn whose brightness is slightly lower than that of the white CLwr is assigned in advance. The dark gray CLbn and the light gray CLwn are defined so as not to change the determination between the bar Br and the space Sp by the barcode reader 13.

The information code Cd2 of the pattern 3 shown in FIG. 5 is a combination bar code obtained by combining a two-dimensional code (for example, a QR code or the like) with the bar code Cd1. In the information code Cd2 of the pattern 3, as in the information code Cd2 of the pattern 2, tracking information is recorded by an arrangement of a plurality of colors having different brightness. In the information code Cd2 of the pattern 3, a two-dimensional code portion CdQ including a plurality of cells arranged two-dimensionally is formed in each partial region of the plurality of bars Br and the plurality of spaces Sp.

The two-dimensional code portion CdQ is formed by image processing in which a two-dimensional code CdO (see FIG. 6) in which tracking information is recorded is superimposed on a part of the barcode Cd1. The two-dimensional code portion CdQ is arranged to face the bar Br inside the left guard bar GbL, and is formed on the bar code Cd1. The length of the extension direction ED of the two-dimensional code portion CdQ is substantially equal to the length of the bar Br of the first data region DA1.

In the information code Cd2, the range forming the two-dimensional code portion CdQ includes four colors of black CLbr, dark gray CLbn, light gray CLwn, and white CLwr. In the plurality of bars Br forming the two-dimensional code portion CdQ, the portion corresponding to the black cell (or dark cell) of the two-dimensional code CdO is the black CLbr. On the other hand, in the plurality of bars Br forming the two-dimensional code portion CdQ, the portion corresponding to the white cell (or light color cell) of the two-dimensional code CdO becomes dark gray CLbn. Further, in the plurality of spaces Sp forming the two-dimensional code portion CdQ, the portion corresponding to the black cell of the two-dimensional code CdO is a light gray CLwn. On the other hand, in the plurality of spaces Sp forming the two-dimensional code portion CdQ, the portion corresponding to the white cell of the two-dimensional code CdO becomes a white CLwr.

Figure 6:
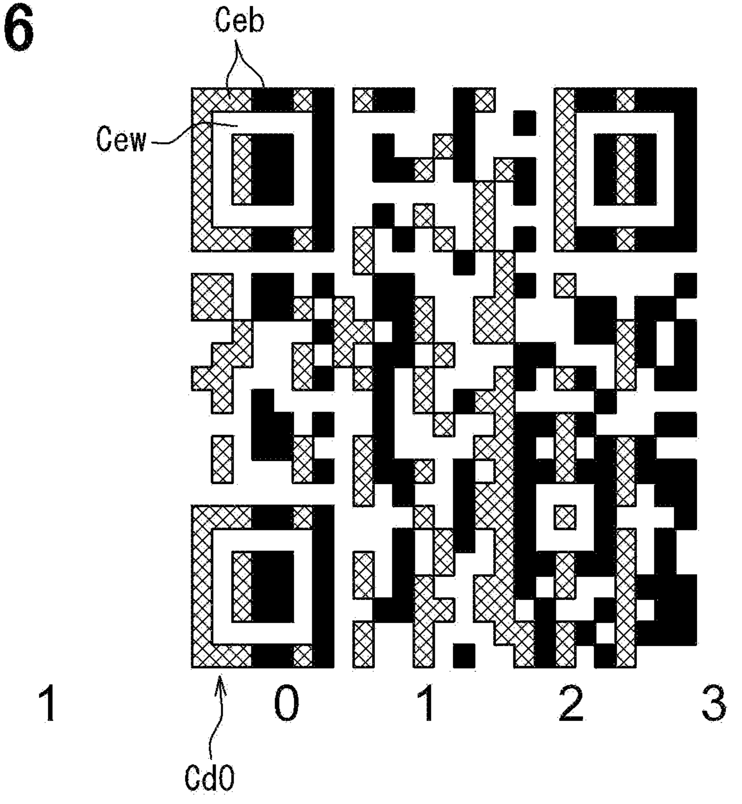
FIG. 6 is a diagram showing a two-dimensional code read from the information code of pattern 3.

Based on the above color scheme, the signal processing unit 23*p* of the code scanner 23 converts the dark gray CLbn part in the bar Br area into a white cell, and converts the light gray CLwn part in the space Sp area into a black cell. Further, the signal processing unit 23*p* recognizes the black CLbr portion in the bar Br region as it is as a black cell, and recognizes the white CLwr portion in the space Sp region as it is as a white cell. As a result of the above, as shown in FIG. 6, the signal processing unit 23*p* restores the two-dimensional code CdO before embedding in which the black cells and the white cells are two-dimensionally arranged. The signal processing unit 23*p* reads the hash value and the IP address, which are tracking information, from the restored two-dimensional code CdO, and notifies the history management server 20 of the occurrence of the transaction.

<Data Capacity of Information Code Cd2>

Next, the details of the data capacity required for the information code Cd2 will be described below.

In order to record the hash value as tracking information, when the above-mentioned SHA-256 is used as the hash function, at least the data capacity (i.e., the number of bits) of "$16^{64} \approx 1.16 \times 10^{77}$" is required. Further, in order to record the IP address as the tracking information, at least the data capacity of "$255^{4} \approx 4.23 \times 10^{9}$" is required. As a result of the above, the desirable data capacity secured in the information code Cd2 is "$16^{64} \times 255^{4} \approx 4.90 \times 10^{86}$" or more.

Here, as in the information code Cd2 (see FIG. 3) of the above-mentioned pattern 1, the data capacity of the color barcode of a plurality of rows is calculated by the following Equation (1) under a condition of the JAN standard barcode Cd1.

$$\text{"Data capacity"} = \text{"number of colors in the bar"}^{(30 \times \text{"number of lines"})} \times \text{"number of colors in the space"}^{(31 \times \text{"number of lines"})} \quad \text{(Equation 1)}$$

According to the above Equation (1), in the case of a six-line color barcode in which six colors are set for the bar Br and two colors are set for the space Sp, the data capacity is "$6^{180} \times 2^{186} \approx 1.14 \times 10^{196}$". That is, the information code Cd2 of the pattern 1 has a sufficient data capacity for recording the hash value and the IP address.

When six colors are set for the bar Br and two colors are set for the space Sp, it may be desirable to divide the information code Cd2 into three or more lines in order to record the hash value and the IP address. Further, when the space Sp is not used for recording information, it may be desirable to divide the information code Cd2 into four or more lines under a condition that six colors are set for the bar Br. Further, when the information code Cd2 is divided into six lines, a sufficient data capacity can be secured by setting three colors for the bar Br.

Further, as in the information code Cd2 (see FIG. 4) of the above-mentioned pattern 2, the data capacity of the monochrome barcode with a plurality of lines has two colors for each of the bar Br and the space Sp, so that the data capacity is calculated by the following Equation (2) under a condition of the bar in the JAN standard.

$$\text{"Data capacity"} = 2^{(30 \times \text{"number of lines"})} \times 2^{(31 \times \text{"number of lines"})} \quad \text{(Equation 2)}$$

According to the above Equation (2), when the monochrome barcode is divided into five lines, the data capacity of "$2^{150} \times 2^{155} \approx 6.52 \times 10^{91}$" is acquired. That is, when it is necessary to record the above-mentioned hash value and IP address, it may be desirable to use a monochrome barcode having five or more lines.

<Size of Information Code Cd2>

In the above-mentioned JAN code, the reference value of the height BH (see FIG. 2) of the barcode Cd1 is defined as 22.86 mm. Further, in the JAN code, it is permitted to cut the height BH of the barcode Cd1 (i.e., the truncation). In addition, it is permissible to reduce the entire barcode Cd1 by 0.8 times. As described above, when a 0.8 times barcode Cd1 is truncated, the height BH of the barcode Cd1 is 9 mm at the minimum.

Here, in the above-mentioned combination bar code (see FIG. 5), the length of one side of the two-dimensional code portion CdQ is substantially the same as the height BH of the bar code Cd1. Therefore, it may be desirable that the two-dimensional code portion CdQ can be read by the code scanner 23 even if the length of one side is about 9 mm.

<Format Information of Information Code Cd2>

In the traceability system 120 under a condition that the information code Cd2 having a plurality of patterns is used, format information indicating which method is used to record the information is further recorded in the information code Cd2. The format information is recorded in the guard bars GbL and GbR at both ends of the longitudinal direction LD of the barcode Cd1. The bar Br and the space Sp arranged in each guard bar GbL and GbR are divided into four parts in the extension direction ED in order to record the format information. As a result, the two bars Br of each guard bar GbL and GbR and the space Sp between them can record 4-bit information, respectively.

As shown in a list in FIG. 7, the format information includes at least type information indicating the type of the information code Cd2, color information indicating the number of colors used, line number information indicating the presence/absence of division and the number of divisions, mask information indicating the mask pattern of the mask process which will be described later. The description rules for the color information, the number of lines information, the mask information, and the like shown in FIG. 7 are examples. For example, the correlation between the black, white, and gray of the divided portion and the on and off of each item may be set to be opposite to the contents shown in FIG. 7.

The type information is information indicating whether the barcode is a normal barcode Cd1 (see FIG. 2), a color barcode (see FIG. 3), a monochrome barcode (see FIG. 4), or a combination barcode (see FIG. 5). The type information is recorded at two locations diagonally located on the left and right guard bars GbL and GbR. As an example, the type information having the same content is recorded in the first and second stages of the outer bar Br of the left guard bar GbL and in the third and fourth stages of the outer bar Br of the right guard bar GbR. The divided portion of each bar Br indicates the type to be read according to the color scheme of black CLbr or dark gray CLbn.

Specifically, when the reading target is the normal barcode Cd1, the two divided portions are both black CLbr. When the reading target is a color barcode, the upper divided portion is black CLbr, and the lower (i.e., the number side) divided portion is dark gray CLbn. When the reading target is a monochrome barcode, the upper divided portion becomes a dark gray CLbn, and the lower divided portion becomes a black CLbr. When the reading target is a combination barcode, the two divided portions are both dark gray CLbn.

According to the above code settings, the code scanner 23 can quickly distinguish between the normal barcode Cd1 and the information code Cd2 including the confidential information. Further, in the combination bar code, a margin (i.e., quiet zone) required on the outer periphery of the two-dimensional code portion CdQ (see FIG. 5) can be efficiently embedded in each guard bar GbL.

The color information is recorded in the left guard bar GbL at all stages of the intermediate space Sp and at the first stage and the second stage of the inner bar Br. The first to fourth stages of the intermediate space Sp indicate the use and non-use of three to six colors, respectively. Similarly, the first and second stages of the inner bar Br indicate the use and non-use of seven and eight colors, respectively. Each divided portion of the intermediate space Sp notifies "non-use" by a white CLwr and "use" by a light gray CLwn. Each divided portion of the inner bar Br notifies "non-use" with a black CLbr and "use" with a dark gray CLbn. According to the above, when it is not a color barcode, the portion where the color information is recorded becomes a normal white CLwr and a black CLbr.

The line number information is recorded in the third and fourth stages of the inner bar Br and the first and second stages of the outer bar Br in the right guard bar GbR. The divided portion of each bar Br shows the value (i.e., 1 to 16) of the number of lines specified in the information code Cd2 by the combination of the color scheme of black CLbr or dark gray CLbn.

The mask information is recorded in the third and fourth stages of the inner bar Br of the left guard bar GbL, and the first and second stages of the inner bar Br of the right guard bar GbR. The divided portion of each bar Br indicates the number associated with the applied mask pattern (hereinafter, the mask number, see FIG. 9) by a combination of the color scheme of black CLbr or dark gray CLbn. It should be noted that each divided portion of the intermediate space Sp of the right guard bar GbR is secured as a place for recording other information.

<Code Generation Process and Code Reading Process>

Figure 8:
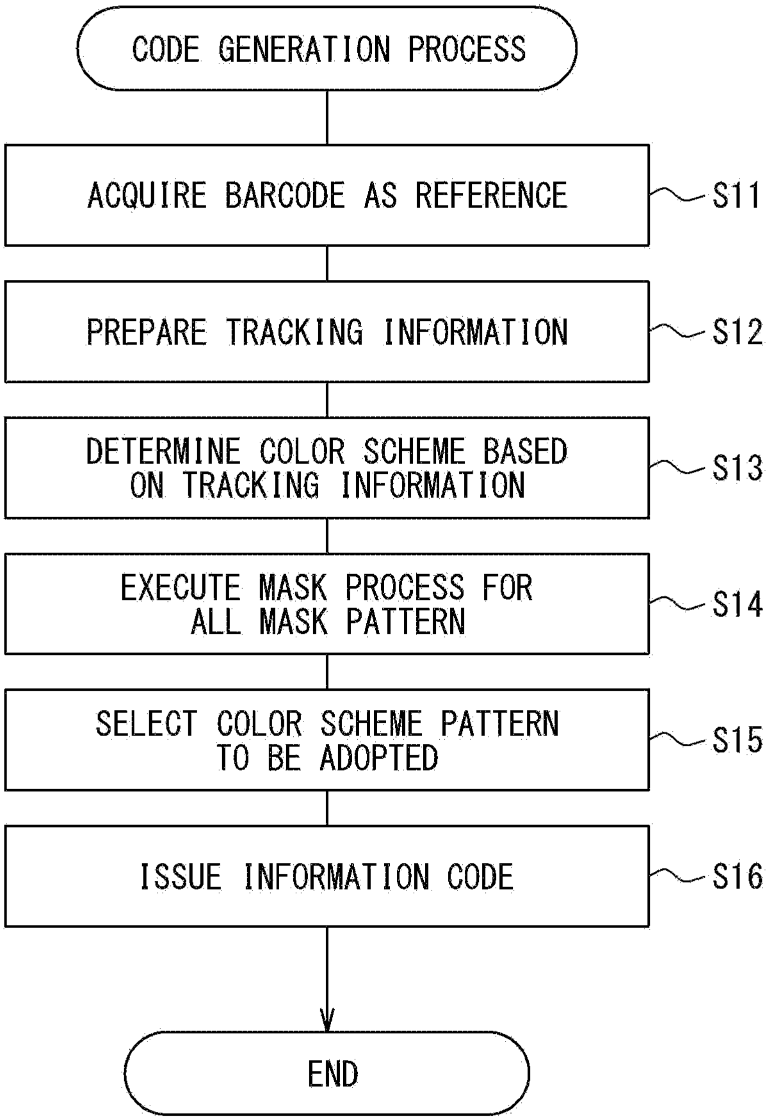
FIG. 8 is a flowchart showing details of a code generation process executed by the history management server.
Figure 9:
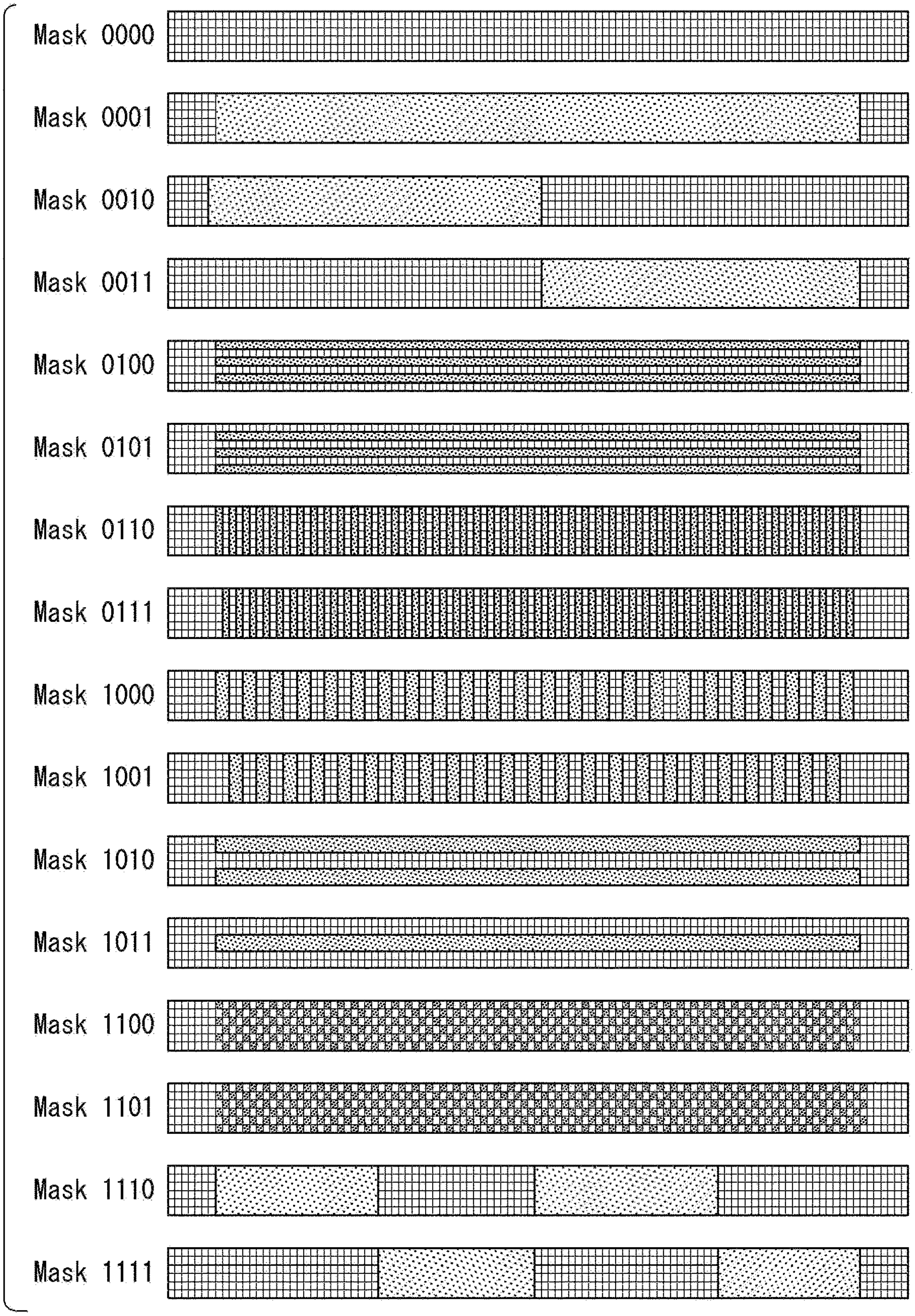
FIG. 9 is a diagram showing a representative example of a mask pattern applied in mask process.
Figure 10:
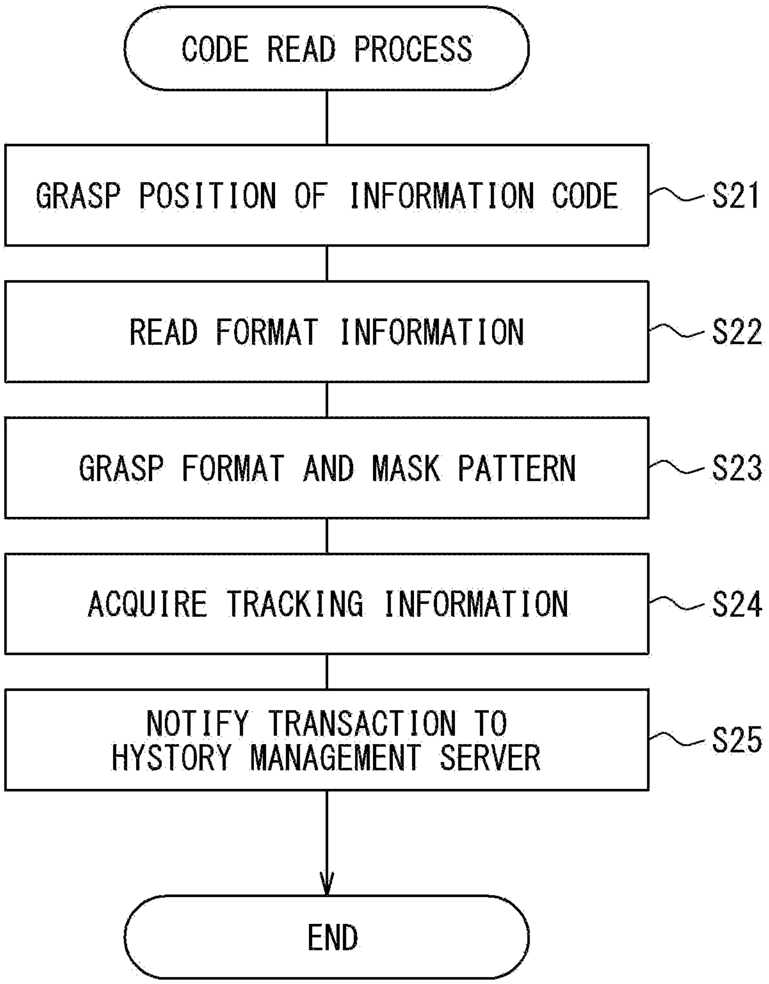
FIG. 10 is a flowchart showing details of a code reading process performed by a code scanner.

Next, the code generation process for generating the information code Cd2 and the code reading process for reading the information code Cd2 described so far will be described below with reference to FIG. 1 based on FIGS. 8 to 10. The code generation process shown in FIG. 8 is started by the history management server 20 in response that the data of the barcode Cd1 is received from the code output device 22. On the other hand, the code reading process shown in FIG. 10 is started by the code scanner 23 based on the input of the reading operation by the operator.

At S11 in the code generation process shown in FIG. 8, the data of the barcode Cd1 transmitted from the code output device 22 is acquired, and the process proceeds to S12. In S12, tracking information to be added to the barcode Cd1 acquired in S11 is prepared, and the process proceeds to S13. In S12, at least the hash value calculated from the latest block and the IP address of the history management server 20 registered in advance are prepared.

In S13, the color scheme of the bar Br and the space Sp of the barcode Cd1 acquired in S11 is determined based on the tracking information prepared in S12, and the process proceeds to S14. In S13, the pattern of the information code Cd2 to be generated (see FIGS. 3 to 5) is determined, and the hash value and the IP address are converted into an array of a plurality of colors according to the data format of the pattern.

In S14, a mask process is performed in which a plurality of mask patterns are individually applied to the reference array of a plurality of colors generated in S13, and the process proceeds to S15. According to the mask process of S14, a plurality of color arrangement patterns in which the arrangements of the plurality of colors are different from each other are generated from the reference color arrangement pattern generated in S13. A plurality of color arrangement patterns having different color schemes are candidates for the adoption pattern to be selected in the next step. The guard bars GbL and GbR on the left and right ends for recording the format information are outside the applicable range of the mask process.

A plurality of mask patterns are prepared for each type of information code Cd2. In addition, a mask pattern corresponding to the number of lines of the information code Cd2 is prepared. As an example, FIG. 9 shows 16 types of mask patterns applied to the information code Cd2 of pattern 1 (see FIG. 3). The mask number is assigned to each mask pattern in advance. In the mask pattern shown in FIG. 9, one cell corresponds to one division portion of the information code Cd2. No color change is performed at the division portion where a blank cell is applied. On the other hand, in the divided portion to which the filled cell is applied, each RGB value that specifies the color is converted according to a predetermined rule. As an example, the divided portion of the bar Br to which the filled cell is applied is converted into a default color that is close to the complementary color of the color before conversion among the preset default colors. It should be noted that one of the plurality of mask patterns may be a mask pattern that outputs the reference color scheme as it is without performing color conversion.

In S15 shown in FIG. 8, one adopted pattern is selected from all the color arrangement patterns generated by the mask process of S14. In S15, the index for determining the adoption pattern may be appropriately changed. As a specific example, the ratio of warm colors and cold colors, the ratio of colors used, the balance of ink consumption when the colors used are printed, and the like may be used as index for determining the adoption pattern. For example, a color scheme in which the colors used are used almost evenly, a color scheme in which a lot of specific colors similar to the package color of the transaction item or the corporate color of the trader are used, and the like are adopted by setting the above index.

In S16, the color scheme of the adopted pattern selected in S15 is applied to each area of the barcode Cd1 to generate the information code Cd2 for output. Then, the data of the generated information code Cd2 is output (i.e., transmitted) to the code output device 22, and the issuance of the information code Cd2 is completed. This completes the code generation process. The code generation process described so far is also performed when a notification indicating the occurrence of a transaction is received from the code scanner 23 and it is determined that the information code Cd2 needs to be reissued.

In S21 of the code reading process shown in FIG. 10, the position of the information code Cd2 arranged on the item, package, or the like is grasped, and the process proceeds to S22. In S22, the format information recorded in the guard bars GbL and GbR of the barcode Cd1 is read, and the process proceeds to S23. In S23, based on the format information read in S22, the format (i.e., type of the information code Cd2) in which the information code Cd2 records the tracking information and the mask pattern applied to the information code Cd2 are grasped, and the process proceeds to S24.

In S24, the color arrangement pattern of each area of the information code Cd2 is decoded based on the content of the format information grasped in S23, the hash value and the IP address which are the tracking information are acquired, and the process proceeds to S25. In S25, the hash value is transmitted to the history management server 20 having the IP address acquired in S24, and the code reading process is completed. The transmission of the hash value by S25 is a notification of the occurrence of a transaction for the item associated with the hash value.

<Note of the First Embodiment>

In the first embodiment described so far, the tracking information recognized by the code scanner 23 is recorded in a format including a hash value. The length (i.e., the number of bits) of such a hash value is predetermined according to the hash function to be used. Therefore, even if the content of the tracking information changes, the information code Cd2 can appropriately record the second information. According to the above, convenience can be ensured even with the information code Cd2 in which the amount of information that can be recorded as tracking information is limited.

In addition, in the information code Cd2 of the pattern 3 of the first embodiment, the tracking information recognized by the code scanner 23 is recorded by an array of a plurality of colors having different brightness within a range that does not change the discrimination of the barcode reader 13. Specifically, tracking information is recorded by the arrangement of black CLbr, dark gray CLbn, light gray CLwn and white CLwr. With such an information code Cd2 having the monochrome color scheme, it is possible to use the information code Cd2 that records the tracking information even if the label printer 12 used as an output means does not support color. Therefore, the convenience of the information code Cd2 can be ensured.

Further, in the first embodiment, the area ratio of each color used for recording the tracking information is adjusted by the mask process to which the masks of a plurality of patterns are applied. According to the above, the information code Cd2 of the color scheme (i.e., color balance) suitable for the attached item or the like can be used. As a result, traceability can be introduced without impairing the commercial value of the transaction item to which the information code Cd2 is attached. Therefore, the convenience of the information code can be ensured.

Further, in the information code Cd2 of the pattern 1 of the first embodiment, tracking information is recorded by an arrangement of a plurality of colors having different hues. In this way, by utilizing the difference in hue, the number of colors assigned to each bar Br can be increased within the range of being identified with the black CLbr by the bar code reader 13. According to the above, the amount of information that can be recorded in the information code Cd2 increases. Therefore, the convenience of the information code Cd2 can be further improved.

In addition, in the information code Cd2 of the pattern 1 of the first embodiment, tracking information is recorded by a plurality of colors specified in the bar Br and a plurality of colors specified in the space Sp. As described above, if the areas of both the bar Br and the space Sp are used for recording the tracking information, it becomes easy to secure the amount of information that can be recorded in the information code Cd2. As a result, the convenience of the information code Cd2 can be easily ensured.

Further, in the information code Cd2 of the pattern 1 and the pattern 2 of the first embodiment, each region of the bar Br and the space Sp is divided into a plurality of stages in the extension direction ED. By dividing the area in this way, the amount of information that can be recorded in the information code Cd2 increases. Therefore, the convenience of the information code Cd2 can be further improved.

Further, in the information code Cd2 of the pattern 3 of the first embodiment, a two-dimensional code portion CdQ including a plurality of cells is formed in each region of the bar Br and the space Sp. The tracking information is recorded in the two-dimensional code unit CdQ. As described above, if the two-dimensional code portion CdQ is used, the amount of information that can be recorded in the information code Cd2 can be significantly increased. Therefore, it is possible to further secure the convenience of the information code Cd2.

In addition, in the first embodiment, the format information for notifying the code scanner 23 of the recording format of the tracking information is further recorded in the barcode Cd1. Therefore, even in the traceability system 120 in which the information code Cd2 having a plurality of patterns can be used, the code scanner 23 can read the tracking information from the information code Cd2 at high speed. Therefore, it becomes possible to provide a highly convenient code scanner 23.

Further, in the first embodiment, format information is recorded in each guard bar GbL, GbR defined at both ends of the longitudinal direction LD of the barcode. As described above, if the recording position of the format information is fixed, the reading speed of the information by the code scanner 23 can be easily increased.

Further, in the first embodiment, the same information is recorded in both the left and right guard bars GbL and GbR. In this way, if the same information is recorded at a distant position, the code scanner 23 can read the information from one of the guard bars GbL and GbR even if a part of the information code Cd2 is damaged or soiled. Based on the above, the convenience of the information code Cd2 can be further improved by acquiring resistance to defects or stains.

In addition, in the first embodiment, the item information read by the barcode reader 13 and the tracking information read by the code scanner 23 are collectively recorded in one information code Cd2. Therefore, it is possible to keep the area of the label or the occupied area on the package smaller than arranging the barcodes or the like in which each information is recorded individually.

Further, when a plurality of barcodes and the like are arranged, there may be a risk of erroneously reading a barcode for another system. In this case, an error may occur and there may be a concern that workability may deteriorate. On the other hand, if a plurality of types of information are collectively recorded in one information code Cd2, a situation in which the reading target is erroneous does not occur. As a result, a highly convenient information code Cd2 with good workability can be realized.

In the above embodiment, the item information corresponds to the "first information", the tracking information corresponds to the "second information", and the label on which the information code Cd2 is printed corresponds to the "information code print medium". In addition, the bar Br corresponds to the "bar area", the space Sp corresponds to the "space area", and the guard bars GbL, GbR correspond to "both ends (in the longitudinal direction of the barcode)". Further, black CLbr, red CLb1, green CLb2, navy blue CLb3, purple CLb4, brown CLb5, white CLwr, yellow CLw1, dark gray CLbn and light gray CLwn correspond to "plurality of colors", respectively. Further, the barcode reader 13 corresponds to the "first reader", the history management server 20 corresponds to the "information code generation device", and the code scanner 23 corresponds to the "second reader" and the "information code reader". The processing unit 20*p* and the signal processing unit 23*p* each correspond to a "processor", the processing unit 20*p* implements an "information code generation method" based on the code generation process, and the signal processing unit 23*p* executes "information code reading method" based on the code reading process.

Second Embodiment

Figure 11:
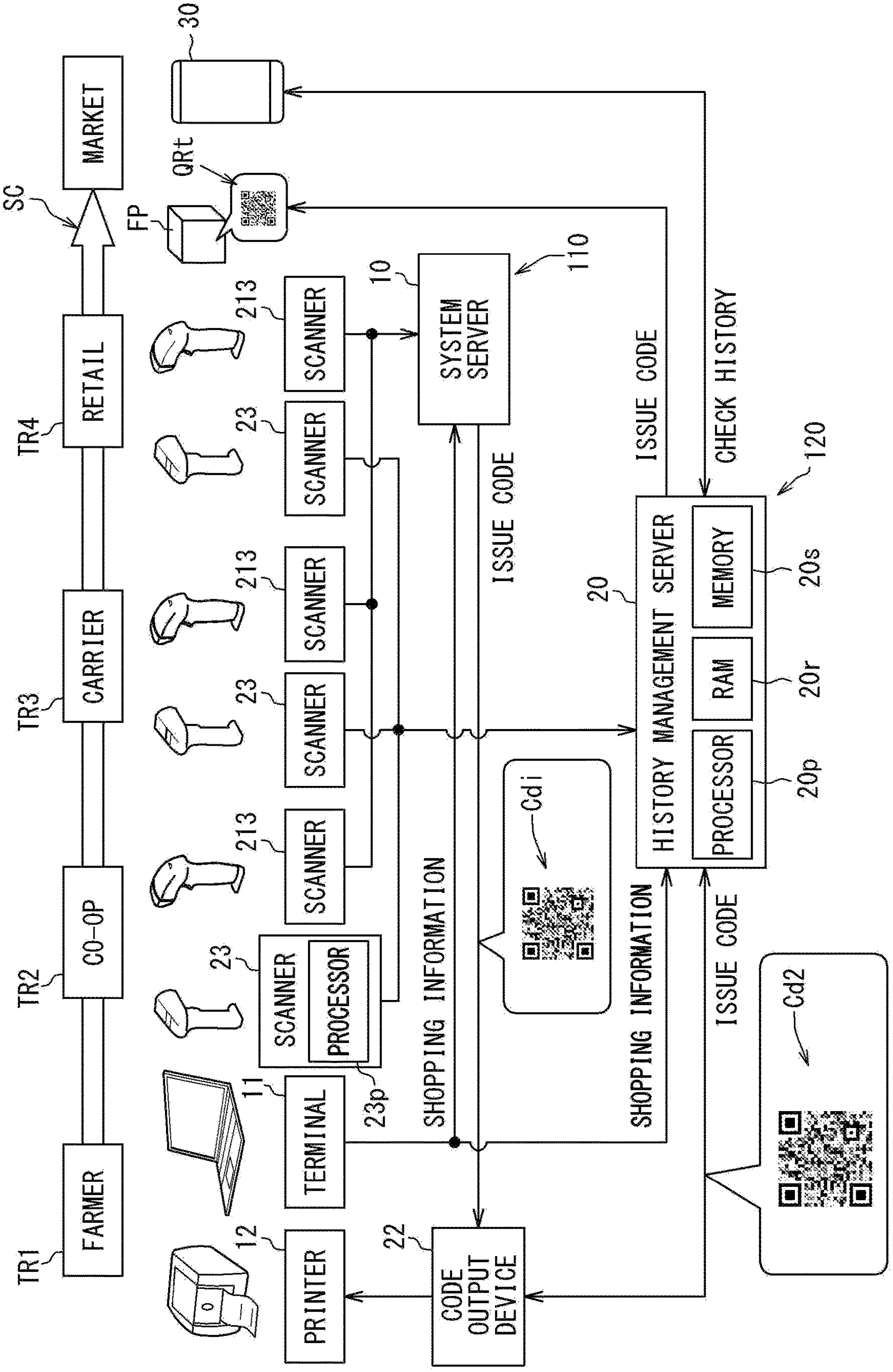
FIG. 11 is a diagram showing an overall view when the traceability system according to the second embodiment of the present disclosure is operated together with an existing distribution management system.
Figure 12:
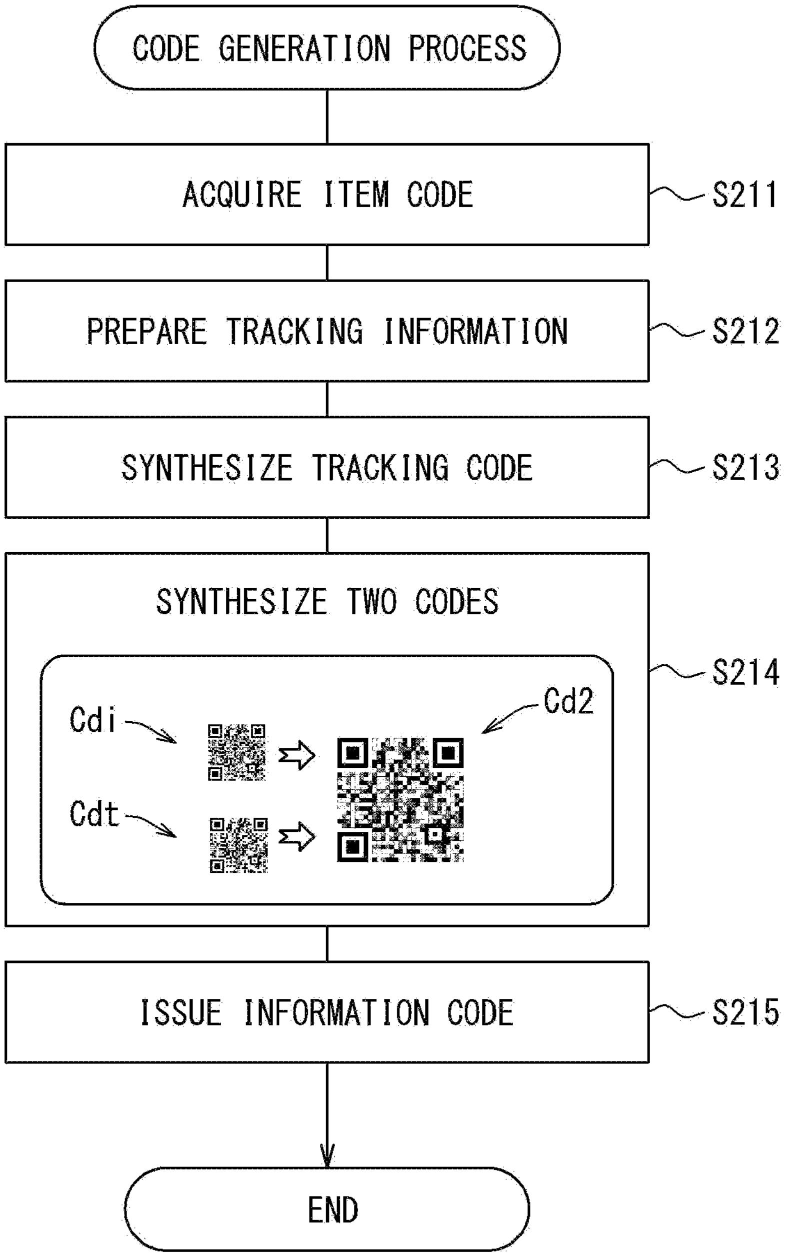
FIG. 12 is a flowchart showing details of the code generation process of the second embodiment.
Figure 13:
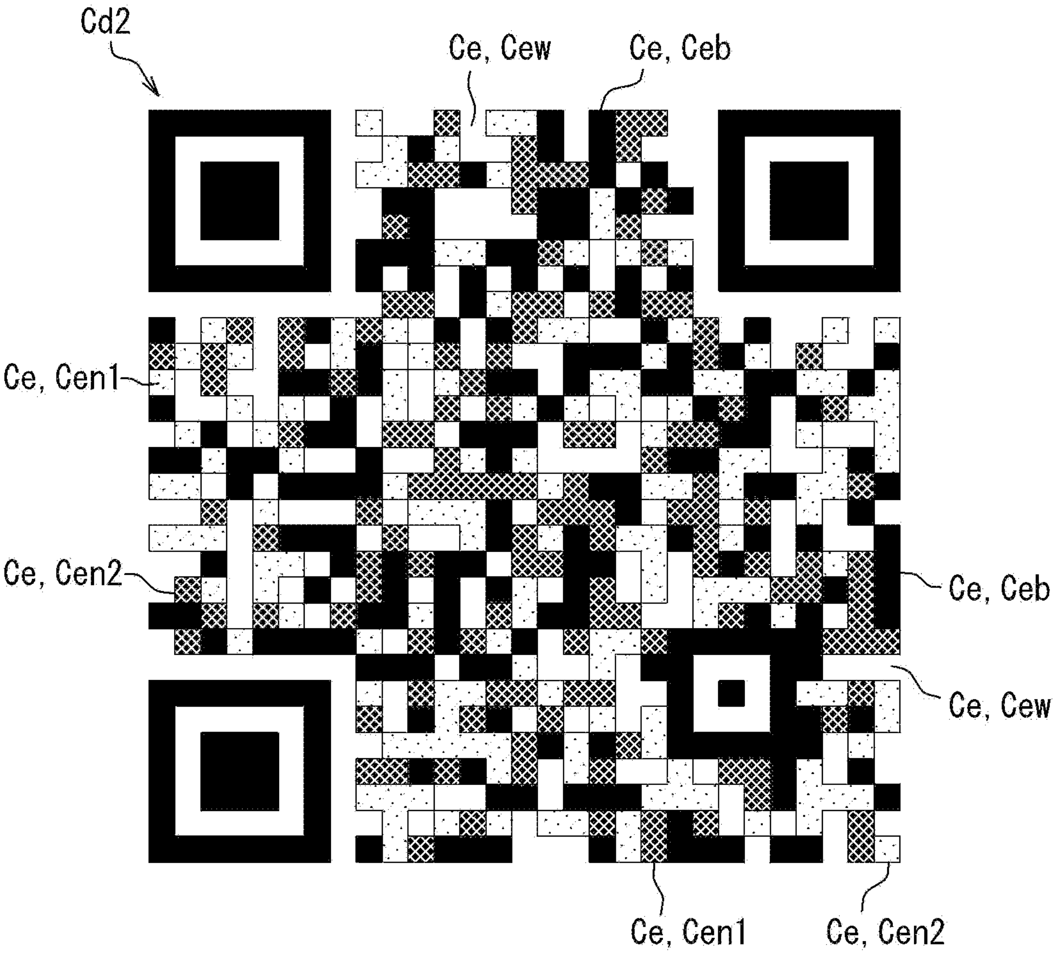
FIG. 13 is a diagram showing details of an information code of the second embodiment.

A second embodiment of the present disclosure shown in FIG. 11 to FIG. 13 is a variation example of the first embodiment. In the distribution management system 110 of the second embodiment, a code scanner 213 capable of reading a two-dimensional code is used instead of the barcode reader 13 (see FIG. 1). The code scanner 23 has substantially the same configuration as the code scanner 23 of the traceability system 120, and has an area sensor and a signal processing unit. The history management server 20 issues a two-dimensional code (hereinafter, item code Cdi) in place of the barcode Cd1 (see FIG. 1).

In the traceability system 120 of the second embodiment, the item code Cdi received by the code output device 22 is transferred to the history management server 20. Upon receiving the item code Cdi, the history management server 20 performs a code generation process (see FIG. 12) and issues an information code Cd2 obtained by modifying the item code Cdi.

When the history management server 20 acquires the item code Cdi in the code generation process (at S211), it prepares tracking information including at least a hash value and an IP address (at S212). The history management server 20 generates a two-dimensional code (hereinafter, tracking code Cdt) that records tracking information separately from the item code Cdi (at S213).

The item code Cdi and the tracking code Cdt are both generated according to the same standard such as a QR code. The item code Cdi and the tracking code Cdt include a large number of cells Ce arranged two-dimensionally, and information is recorded by an array of white cells Cew and black cells Ceb. The number of vertical and horizontal cells Ce of the tracking code Cdt is the same as the number of vertical and horizontal cells Ce of the item code Cdi.

The history management server 20 generates an information code Cd2 which is a two-dimensional code (at S214) by a synthesis process of superimposing the item code Cdi and the tracking code Cdt, and transmits the generated information code Cd2 to the code output device 22 (at S215). The information code Cd2 thus issued is printed by the label printer 12. A label printed with the information code Cd2 is attached to the transaction item and circulates among the traders.

As shown in FIG. 12, the plurality of cells Ce forming the information code Cd2 include a light gray cell Cen1 and a dark gray cell Cen2 in addition to the white cell Cew and the black cell Ceb. The light gray cell Cen1 has a light gray CLwn which is a neutral color closer to the white cell Cew than the black cell Ceb. The dark gray cell Cent2 has a dark gray CLbn which is a neutral color closer to the black cell Ceb than the white cell Cew. In the code scanner 213 (see FIG. 11), the light gray cell Cen1 is discriminated in the same manner as the white cell Cew, and the dark gray cell Cen2 is discriminated in the same manner as the black cell Ceb.

In the synthesizing process of synthesizing the two codes, if the cells of each code are both white cell Cew, the cell Ce of the superimposed information code Cd2 is also the white cell Cew. Similarly, when the cells of each code are both black cells Ceb, the cell Ce of the superimposed information code Cd2 is also a black cell Ceb. On the other hand, when the item code Cdi is the white cell Cew and the tracking code Cdt is the black cell Ceb, the cell Ce of the superimposed information code Cd2 becomes the light gray cell Cen1. Further, when the item code Cdi is the black cell Ceb and the tracking code Cdt is the white cell Cew, the cell Ce of the superimposed information code Cd2 becomes a dark gray cell Cen2.

The mask process as in the first embodiment may be applied to the above information code Cd2. In such mask process, the ratio of white cell Cew, black cell Ceb, light gray cell Cen1 and dark gray cell Cen2 is adjusted to be 25% each. According to such adjustment, by setting the error correction implemented by the Reed-Solomon code to about 30%, it becomes possible to read the correct information even if one specific color is always misread.

The code scanner 23 (see FIG. 11) distinguishes between the white cell Cew and the light gray cell Cen1. In addition, the code scanner 23 distinguishes between the black cell Ceb and the dark gray cell Cent2. In the code reading process for reading the information code Cd2, the code scanner 23 considers the light gray cell Cen1 to be the same as the black cell Ceb and the dark gray cell Cen2 to be the same as the white cell Cew. By such processing, the code scanner 23 can read the tracking information capable of extracting the tracking code Cdt from the information code Cd2.

The information code Cd2 of the second embodiment described so far includes a light gray cell Cen1 and a dark gray cell Cent together with a normal white cell Cew and a black cell Ceb. As a result, the item information recognized by the code scanner 213 and the tracking information recognized by the code scanner 23 can be recorded in one information code Cd2. Further, since information can be recorded by a plurality of cells Ce arranged in two dimensions, it becomes easy to secure the amount of information that can be recorded as tracking information. As a result, the convenience of the information code Cd2 can be ensured.

In addition, in the second embodiment, since the item code Cdi and the tracking code Cdt are combined into one information code Cd2, the area of the label or the occupied area on the package is smaller than arranging these two-dimensional codes side by side.

Further, when a plurality of two-dimensional codes are arranged side by side, the code scanner 213 starts reading the two-dimensional code for the traceability system 120 even if it tries to read the two-dimensional code for the distribution management system 110. However, if the information for a plurality of systems is collectively recorded in one information code Cd2, the information for the existing system is made public, and the information for the new system is kept secret, erroneous reading of the code is avoided. As a result, a highly convenient information code Cd2 with good workability can be realized.

Further, when recording information for a plurality of systems in a two-dimensional code (for example, SQRC, registered trademark) that can conceal and record specific information, there may be a difficulty that the size of each cell becomes small. Such a difficulty can also be solved by the above-mentioned information code Cd2 using a neutral color.

In the second embodiment, the light gray CLwn corresponds to the “first intermediate color”, the dark gray CLbn corresponds to the “second intermediate color”, the light gray cell Cen1 corresponds to the “first intermediate color cell”, and the dark gray cell Cent corresponds the “second intermediate color cell”. Further, the code scanner 213 corresponds to the “first reader”.

Third Embodiment

Figure 14:
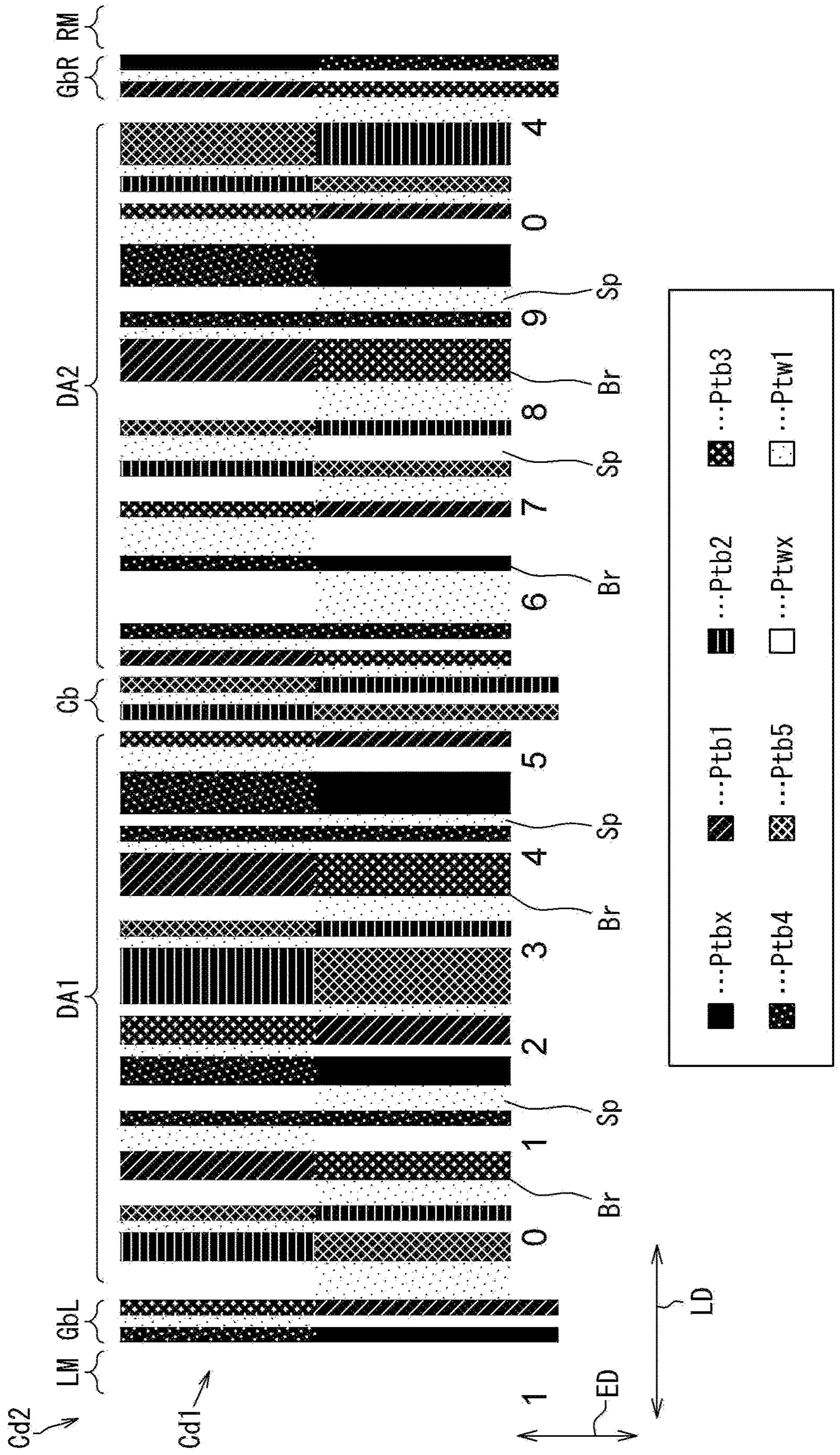
FIG. 14 is a diagram showing details of an information code of the third embodiment.

The third embodiment of the present disclosure shown in FIG. 14 is another modification of the first embodiment. In the third embodiment, a monochrome printer that does not support gray scale is adopted as the label printer 12 of the distribution management system 110. The information code Cd2 of the third embodiment is printed with a label printer 12 that cannot output intermediate colors, and records tracking information by a method different from the arrangement of a plurality of colors.

A pattern is formed in each region of the bar Br and the space Sp of the information code Cd2. As an example, in the information code Cd2, five types of patterns formed on the bar Br and one type of pattern formed on the space Sp are defined in advance. Each pattern formed on the bar Br is a white pattern with a black background. The pattern formed in the space Sp is a black pattern (such as a dot pattern, and the like) against a white background. The pattern may be appropriately changed such as a dot pattern, a diagonal line pattern, a striped pattern, and a checker pattern. Each pattern formed on the bar Br and the space Sp is not recognized by the bar code reader 13. That is, in the bar code reader 13, the bar Br and the space Sp in which the pattern is formed are treated in the same manner as the bar Br and the space Sp in which the pattern is not formed. As a result, even if the pattern is formed, the barcode reader 13 can read the barcode in the same manner as the normal barcode Cd1.

The information code Cd2 records the tracking information by using an array of the normal regions Ptbx and Ptwx of the bar Br and the space Sp without the pattern and the pattern regions Ptb1 to Ptb5 and Ptw1 of the bar Br and the space Sp with the pattern. The code scanner 23 recognizes the presence/absence of a pattern in each region Ptbx, Ptwx, Ptb1 to Ptb5, Ptw1 of the bar Br and the space Sp, and the difference in the pattern shape. Therefore, the code scanner 23 can read the tracking information recorded by the arrangement of each region Ptbx, Ptwx, Ptb1 to Ptb5, Ptw1.

In the third embodiment described so far, a pattern is used for recording information in the bar Br and the space Sp instead of the colors of the bar Br and the space Sp. That is, the tracking information recognized by the code scanner 23 is recorded by the arrangement of the regions Ptb1 to Ptb5 and Ptw1 forming the predetermined pattern. Therefore, even when the label printer 12, which is the output means of the information code Cd2, does not support color output and intermediate color output, the information code Cd2 that records the tracking information can be used. Therefore, the convenience of the information code Cd2 can be ensured. In the third embodiment, the pattern regions Ptb1 to Ptb5 and Ptw1 correspond to “regions”.

Other Embodiments

Although a plurality of embodiments according to the present disclosure have been described above, the present disclosure is not construed as being limited to the above-mentioned embodiments, and can be applied to various embodiments and combinations within a scope not departing from the spirit of the present disclosure.

Figure 15:
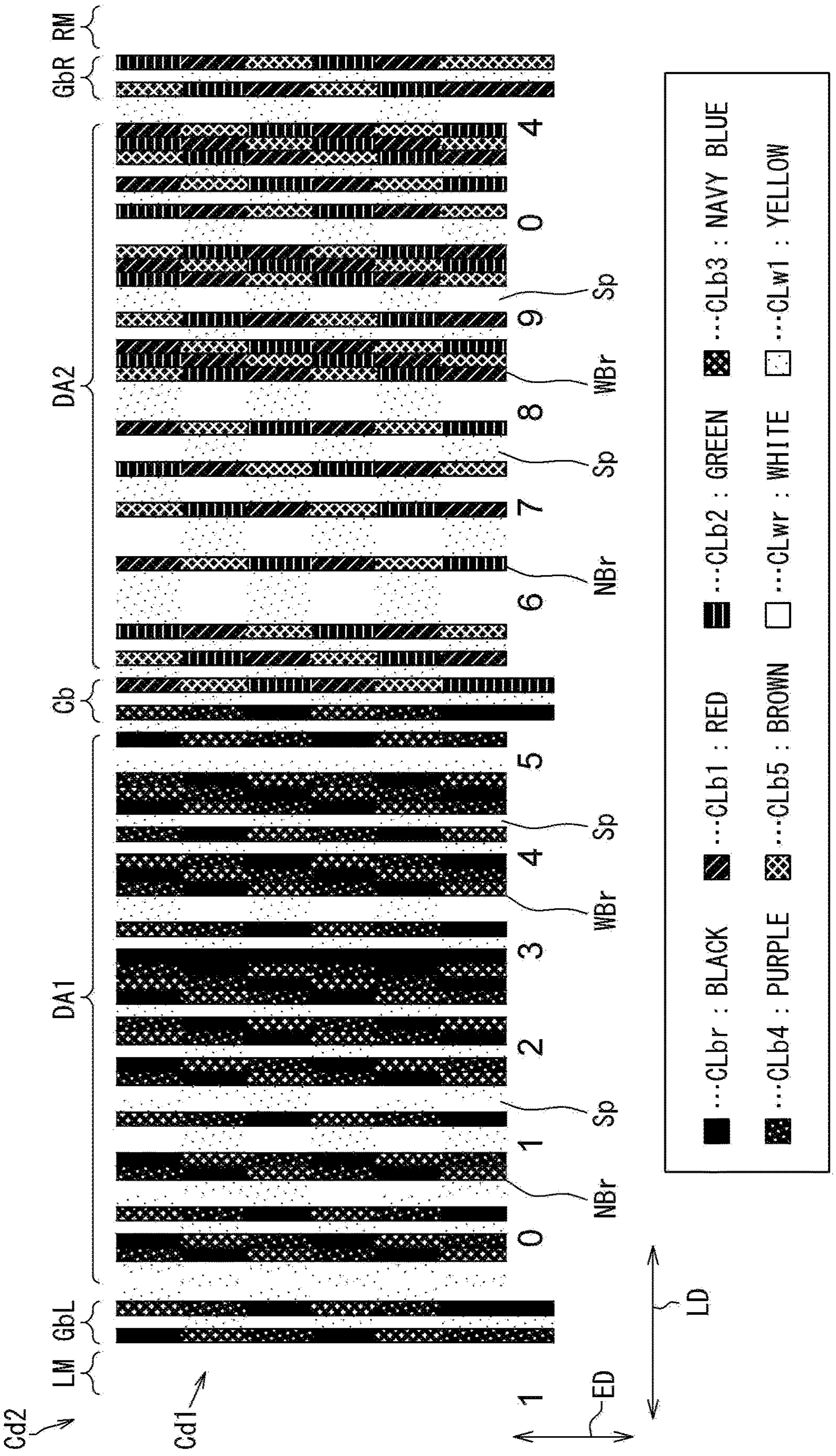
FIG. 15 is a diagram showing details of an information code according to a modification 1.

In the information code Cd2 of the modification 1 shown in FIG. 15, each wide bar WBr is divided into a plurality of regions in the longitudinal direction LD. In other words, the width of one divided portion in the bar region is constant regardless of the narrow bar NBr and the wide bar WBr. According to such a wide bar WBr division method, it becomes easier to secure the amount of information that can be recorded in the information code Cd2.

Figure 16:
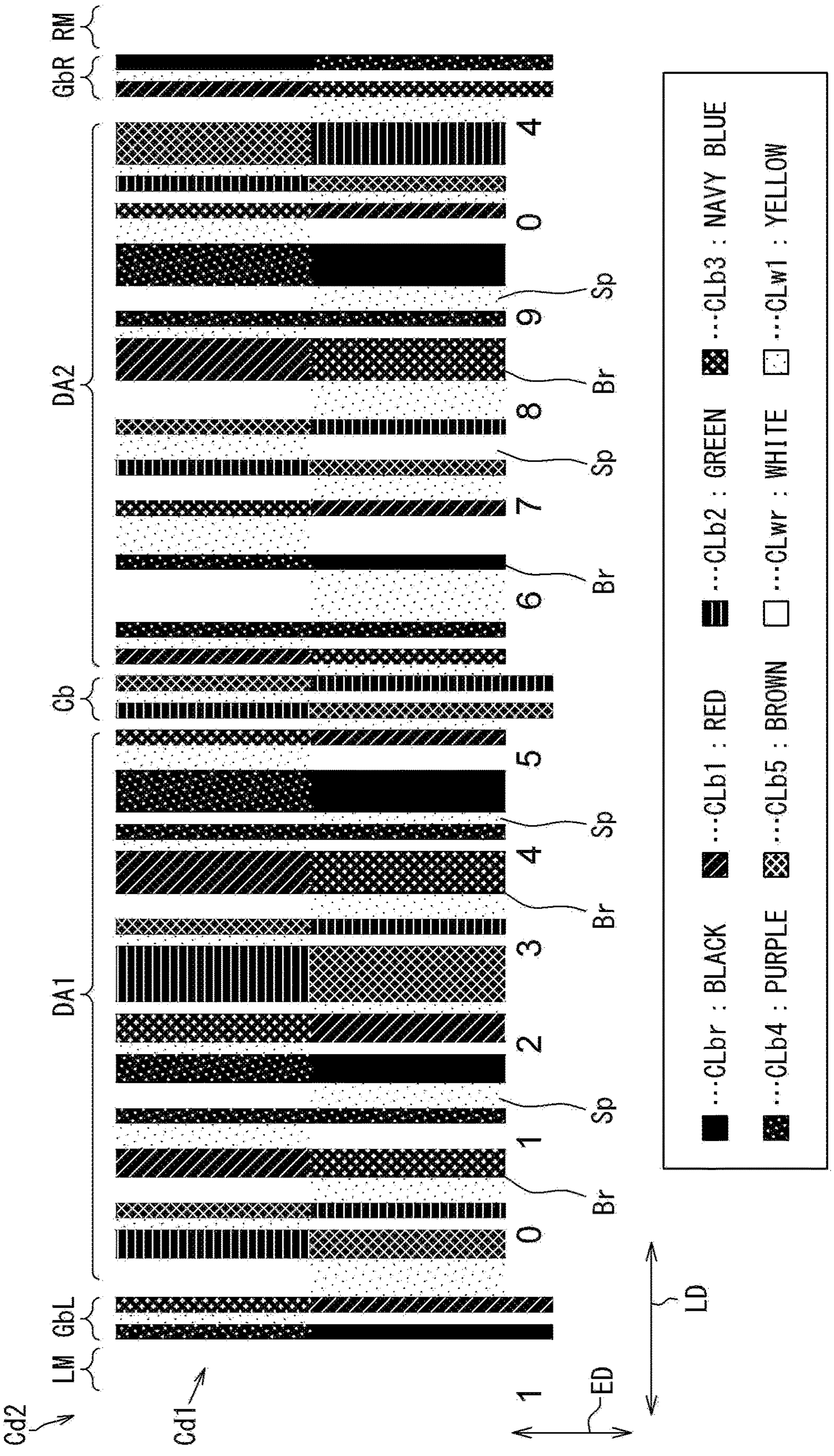
FIG. 16 is a diagram showing details of an information code according to a modification 2.
Figure 17:
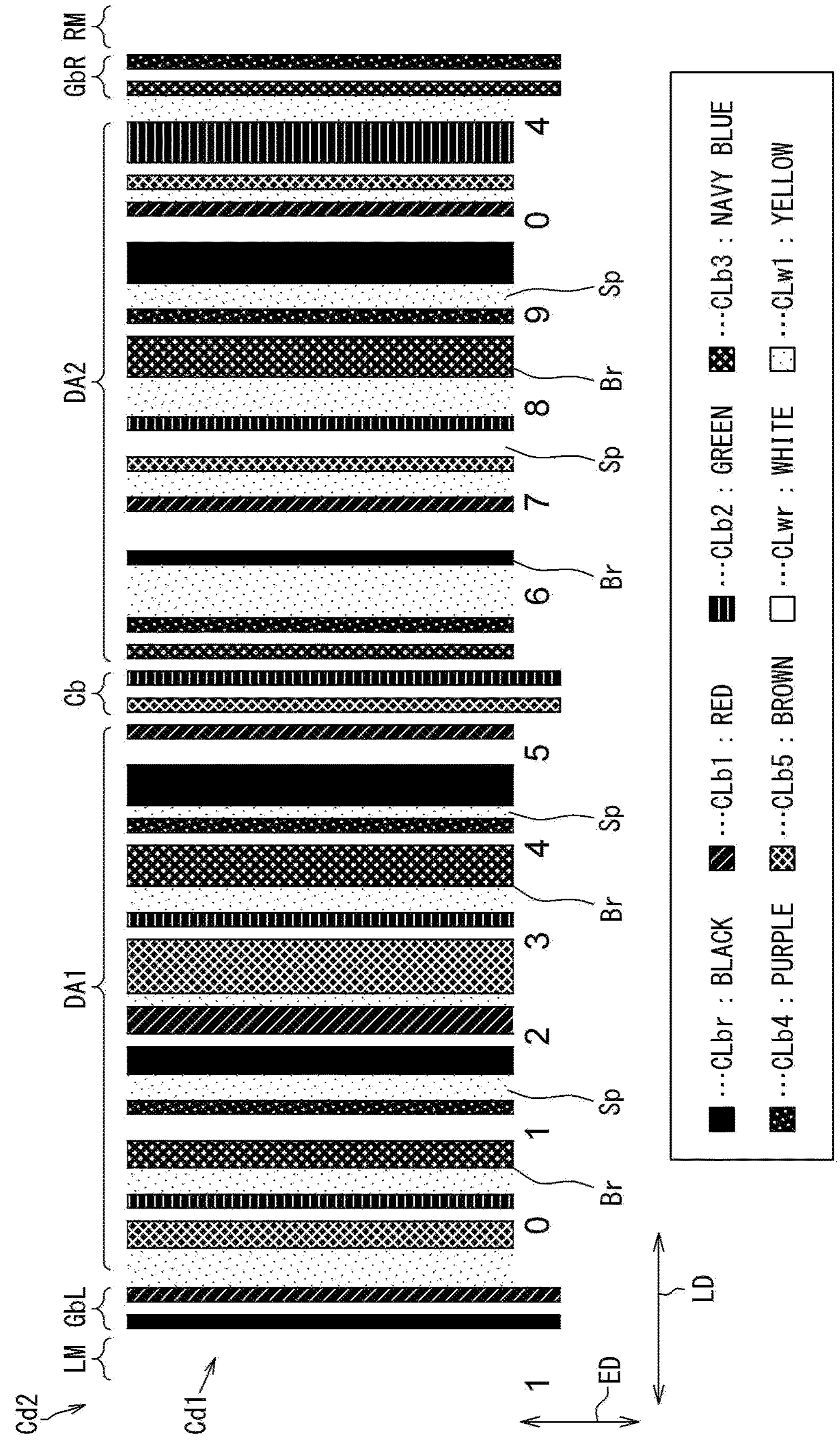
FIG. 17 is a diagram showing details of an information code according to a modification 3.

In the information code Cd2 of the modification 2 shown in FIG. 16 and the information code Cd2 of the modification 3 shown in FIG. 17, the tracking information is recorded in both areas of the plurality of bars Br and the plurality of spaces Sp in the same manner as the information code Cd2 of the pattern 1 (see FIG. 3). The region of each bar Br is one of black CLbr, red CLb1, green CLb2, navy blue CLb3, purple CLb4, brown CLb5, and the like. Further, the region of each space Sp is white CLwr or yellow CLw1.

On the other hand, the information code Cd2 of the modification 2 is divided into two parts in the extension direction ED. On the other hand, in the information code Cd2 of the modification 3, each region is not divided into the extension direction ED. Therefore, the amount of information that can be recorded is larger in the information code Cd2 of the modified example 2 than in the information code Cd2 of the modified example 1.

Figure 18:
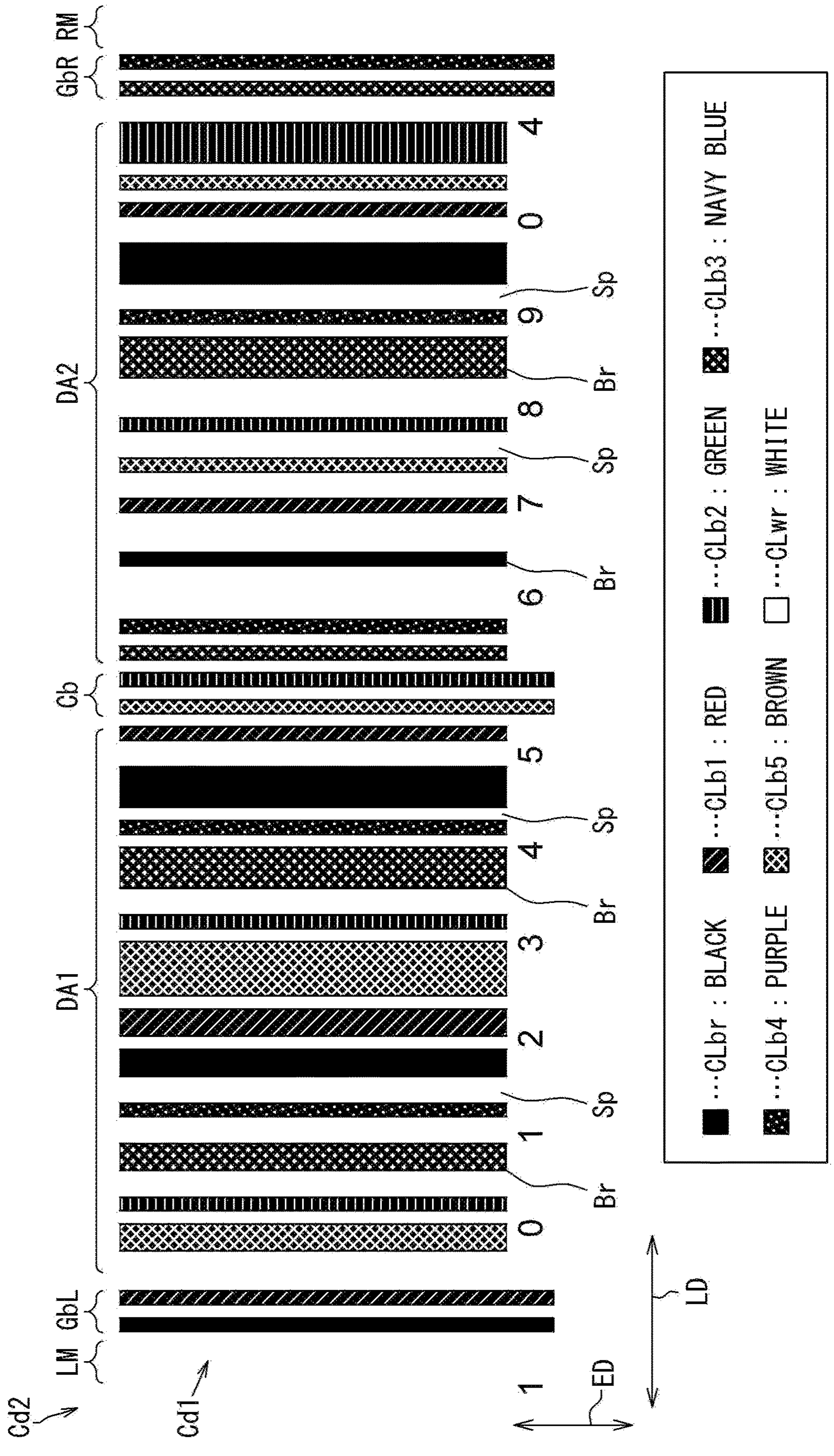
FIG. 18 is a diagram showing details of an information code according to a modification 4.

In the information code Cd2 of the modification 4 shown in FIG. 18, only the bar Br is used for recording the additional information among the regions of the bar Br and the space Sp. That is, while the bar Br is divided into a plurality of colors and painted separately, the entire area of the space Sp is white. When the amount of information to be added to the barcode Cd1 is small, the information code Cd2 of the modification 4 can be used.

Figure 19:
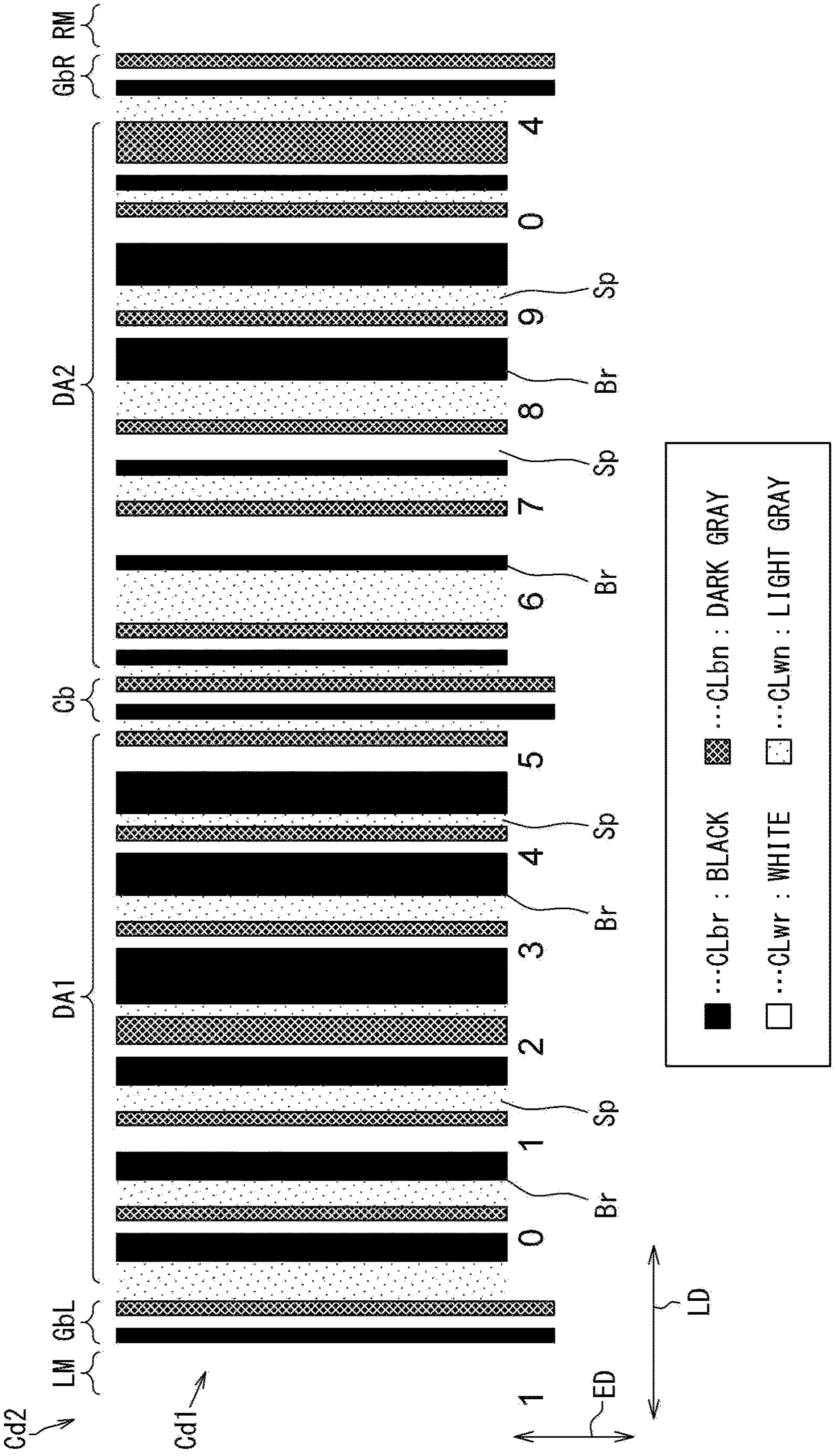
FIG. 19 is a diagram showing details of an information code according to a modification 5.
Figure 20:
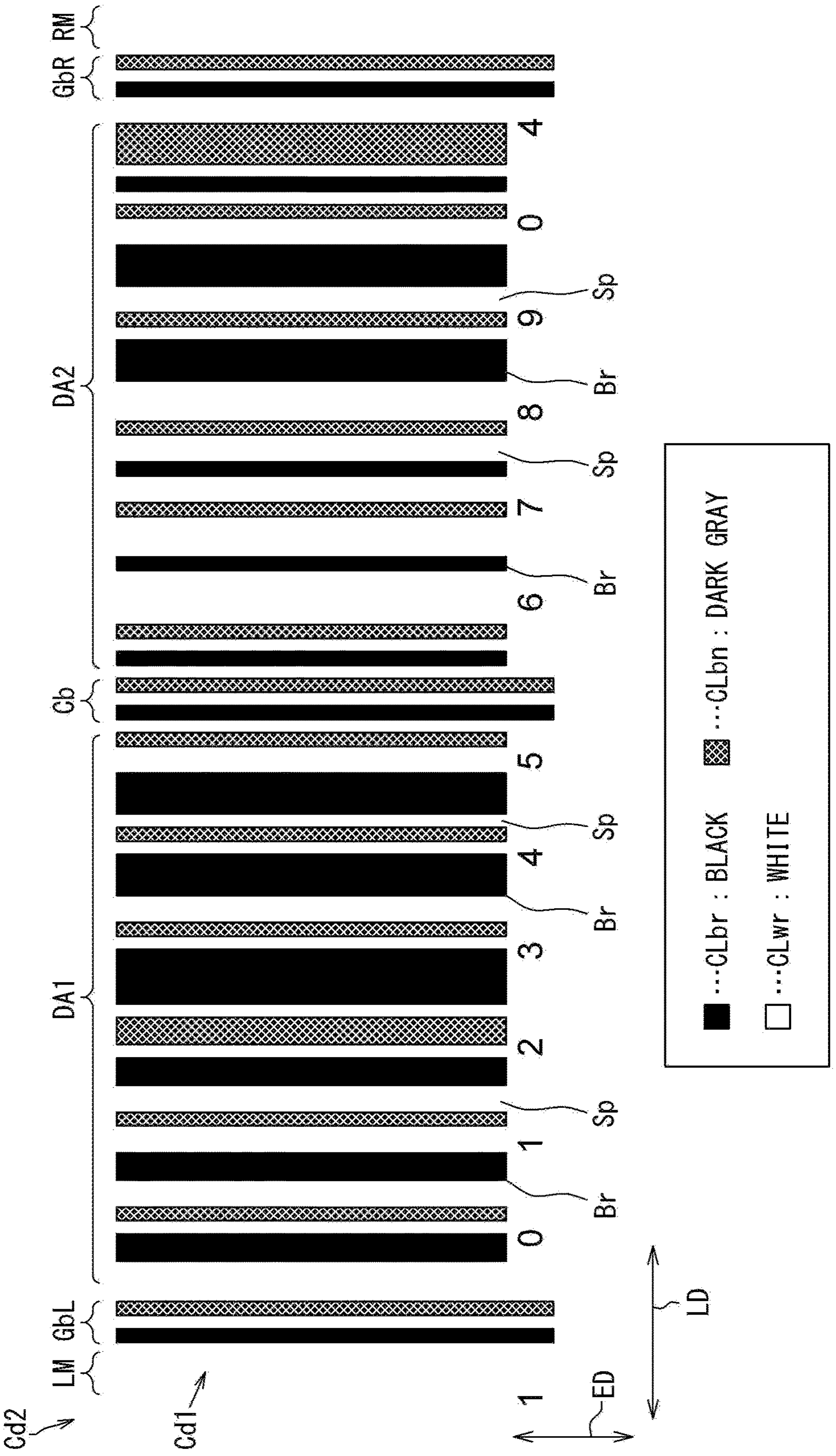
FIG. 20 is a diagram showing details of an information code according to a modification 6.

In the information code Cd2 of the modification 5 shown in FIG. 19, as in the information code Cd2 of the pattern 2 (see FIG. 4), additional information is recorded by using a plurality of colors having different brightness such as black, white, light gray CLwn, and dark gray CLbn. In the information code Cd2 of the modification 5, both the bar Br and the space Sp regions are used for recording information. Further, also in the information code Cd2 of the modification 6 shown in FIG. 20, the recording of additional information is realized by using a plurality of colors having different brightness such as black and dark gray CLbn. In the information code Cd2 of the modification 6, only the area of the bar Br is used for recording the information. That is, the divided portion of the light gray CLwn in the space Sp is omitted in the modification 6.

Further, in the information code Cd2 (i.e., color barcode) of the modification 7, only the space Sp that forms the arrangement pattern of the white CLwr and the yellow CLw1 is used for recording the additional information among the regions of the bar Br and the space Sp. Further, in the information code Cd2 (i.e., monochrome barcode) of the modification 8, only the space Sp that forms the arrangement pattern of the white CLwr and the light gray CLwn is used for recording additional information in each region of the bar Br and the space Sp. Further, even in the information code Cd2 (i.e., patterned barcode) of the modification 9 of the third embodiment, the pattern is formed only in the area of the space Sp. Furthermore, the amount of information that can be recorded may be secured by combining the difference in color and the difference in pattern.

In the information code of the modification 10 of the above embodiment, additional information is recorded by using an array of a plurality of colors having different saturations. Further, in the information code Cd2 of the modification 11 of the second embodiment, the two-dimensional code portion CdQ (see FIG. 5) is concealed in the barcode Cd1 by the combination of a plurality of colors.

In the first embodiment, the divided portions of the black CLbr and the white CLwr are left in both the bar Br and the space Sp, respectively. Alternatively, in the information code Cd2 of the modification 12, all the divided portions are chromatic. Further, in the third embodiment, the non-patterned regions Ptbx and Ptwx are left in both the bar Br and the space Sp. Alternatively, in the modified example 13, a pattern is formed in all the regions of the bar Br and the space Sp.

In the modified example 14 of the third embodiment, the density of the diagonal lines to be printed is controlled in response to the fact that the label printer cannot produce neutral colors as in the third embodiment. In the modification 14, the pseudo dark gray CLbn and the pseudo light gray CLwn are reproduced on the paper medium by controlling the diagonal line density. Specifically, by increasing the diagonal line density, a dark gray CLbn is expressed. Further, by lowering the diagonal line density, a light gray CLwn is expressed. According to such a method, it is possible to add tracking information even if a label printer capable of printing only black or white is used.

In the traceability system 120 of the above embodiment, the information code Cd2 is printed on a paper medium. Alternatively, the information code Cd2 may be displayed on the screen of a display, for example. The barcode reader and the code scanner may be able to read the information code Cd2 displayed on the screen. Further, the paper medium on which the information code Cd2 is printed may be a stack of a plurality of sheets having a transfer function, or may be formed so that a part of the paper can be cut and separated.

As described above, the data such as the barcode Cd1 and the information code Cd2 can be changed to a data format compatible with the system such as image data, text data, and a specific program code. Further, the code generation process performed by the history management server 20 may be performed by the code output machine 22 on the edge side. In such a form, the code output device 22 corresponds to an "information code generation device".

When an existing distribution management system 110 as in the present disclosure is in operation, if a new traceability system 120 using a block-chain is to be introduced, the distribution management system 110 usually requires a major modification. In this case, time for the modification may be also required. This made it difficult to introduce the traceability system 120.

Therefore, in the traceability system 120 of the present disclosure, the information code Cd2 that can record additional information while maintaining the function of the barcode Cd1 is used. As a result, the traceability management function by the block-chain can be easily added. That is, the compatibility of the traceability system 120 with the conventional system can be improved.

The content of the additional information (i.e., second information) recorded in the information code Cd2 may be changed as appropriate. For example, the URL of the history management server 20 may be recorded instead of the IP address. Further, the block-chain may not be used for managing the transaction record in the history management server 20. The final product FP provided through the supply chain SC is not limited to the agricultural product as described above. For example, the final product FP may be an industrial product, a marine product, or the like.

In the above embodiment and modifications, the respective functions provided by the history management server and the like can be also provided by software and hardware for executing the software, only software, only hardware, and combinations of software and hardware. In cases where these functions are provided by electronic circuits as hardware, the respective functions can be also provided by analog circuits or digital circuits which include a large number of logic circuits.

In the foregoing embodiments, the processing unit (or the signal processing unit) and the like may include at least one operational core, such as a central processing unit (CPU) or a graphics processing unit (GPU). The processing unit 11 may further include a field-programmable gate array (FPGA), a neural network processing unit (NPU), an IP core having other dedicated functions, and the like. Further, these processing units may be individually mounted on a printed circuit board, or may be mounted on an ASIC (Application Specific Integrated Circuit) or the like.

The form of the storage medium (i.e., the non-transitory tangible storage medium, or permanent physical computer readable storage medium) adopted as each storage unit of the above-described embodiment and storing each program related to the generation and reading of the information code of the present disclosure is appropriately used and changed. For example, the storage medium is not limited to the configuration provided on the circuit board, and may be provided in the form of a memory card or the like. The storage medium may be inserted into a slot portion, and electrically connected to the computer bus. The storage medium may be provided by an optical disk which includes a program source to be copied into a computer, a hard disk drive, or the like.

The processor and the method thereof which have been described in the present disclosure may be also implemented by a special purpose computer which includes a processor programmed to execute one or more functions implemented by computer programs. Alternatively, the apparatus and the method described in the present disclosure may be implemented by a special purpose hardware logic circuit. Alternatively, the apparatus and the method described in the present disclosure may be implemented by one or more special purpose computers configured by a combination of a processor executing a computer program and one or more hardware logic circuits. The computer program may be stored, as instructions to be executed by a computer, in a tangible non-transitory computer-readable medium.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An information code that records information read by a first reader and a second reader, the information code comprising:

a plurality of bar areas; and a plurality of space areas disposed between the plurality of bar areas, wherein:

the plurality of the bar areas and the plurality of space areas provide a barcode for recording a first information recognized by the first reader; and at least one of the plurality of bar areas and the plurality of space areas provide a second information recognized by the second reader in a format including a hash value with an arrangement of a plurality of colors defined so as not to change a discrimination between the bar areas and the space areas by the first reader, wherein the barcode records format information for notifying the second reader of a recording format of the second information.

2. The information code according to claim 1, wherein:

the second information is recorded by the arrangement of the plurality of colors having different hues.

3. The information code according to claim 1, wherein:

the second information is recorded by the arrangement of a plurality of colors defined in the bar areas and a plurality of colors defined in the space areas.

4. The information code according to claim 1, wherein:

at least one of the plurality of bar areas and the plurality of space areas is divided into a plurality of stages in an extension direction of the bar areas.

5. The information code according to claim 1, wherein:

the plurality of bar areas and the plurality of space areas provide a two-dimensional code portion including a plurality of cells arranged in two dimensions; and the second information is recorded in the two-dimensional code portion.

6. The information code according to claim 1, wherein:

the format information is recorded at both ends of the barcode in a longitudinal direction of the barcode.

7. An information code that records information read by a first reader and a second reader, the information code comprising:

a plurality of bar areas; and a plurality of space areas disposed between the plurality of bar areas, wherein:

the plurality of the bar areas and the plurality of space areas provide a barcode for recording a first information recognized by the first reader; and at least one of the plurality of bar areas and the plurality of space areas provide a second information recognized by the second reader according to an arrangement of a plurality of colors having different brightness within a range that does not change a discrimination between the bar areas and the space areas by the first reader, wherein the barcode records format information for notifying the second reader of a recording format of the second information.

8. An information code that records information read by a first reader and a second reader, the information code comprising:

a plurality of bar areas; and a plurality of space areas disposed between the plurality of bar areas, wherein:

the plurality of the bar areas and the plurality of space areas provide a barcode for recording a first information recognized by the first reader; and a predetermined pattern is disposed in at least one of the plurality of bar areas and the plurality of space areas; and at least one of the plurality of bar areas and the plurality of space areas provide a second information recognized by the second reader according to an arrangement of each area in which the predetermined pattern is disposed, wherein the barcode records format information for notifying the second reader of a recording format of the second information.

9. The information code according to claim 8, wherein:

the second information is recorded in a format including a hash value.

10. An information code comprising:

a plurality of cells arranged in two dimensions and recording both a first information read by a first reader and a second information read by a second reader, wherein:

the plurality of cells include:

a light color cell;

a dark color cell;

a first intermediate color cell that has a first intermediate color closer to the light color cell than the dark color cell, is discriminated in a same manner as the light color cell by the first reader, and is distinguished from the light color cell by the second reader; and a second intermediate color cell that has a second intermediate color closer to the dark color cell than the light color cell, is discriminated in a same manner as the dark color cell by the first reader, and is distinguished from the dark color cell by the second reader.

11. An information code generation method for generating an information code that records information read by a first reader and a second reader, the method for causing at least one processor to execute:

acquiring a barcode including a plurality of bar areas and a plurality of space areas and recording a first information recognized by the first reader;

determining a color arrangement pattern based on a second information recognized by the second reader, the color arrangement pattern being applied to at least one of the plurality of the bar areas and the plurality of space areas and having a plurality of colors that are defined so as not to change a discrimination between the bar areas and the space areas by the first reader;

generating a plurality of candidates that have different arrangements of the plurality of colors from each other, by applying a mask having a plurality of patterns to the color arrangement pattern; and selecting one adoption pattern from the plurality of candidates.

* * * * *